US012786605B2

(12) United States Patent
Lewis et al.

(10) Patent No.: US 12,786,605 B2
(45) Date of Patent: Nov. 3, 2026

(54) BOAT SPEAKER SYSTEM

(71) Applicant: Skier's Choice, Inc., Maryville, TN (US)

(72) Inventors: Ryan C. Lewis, Maryville, TN (US); Donald C. Nesbit, Jr., Knoxville, TN (US)

(73) Assignee: Skier's Choice, Inc., Maryville, TN (US)

( * ) Notice: Subject to any disclaimer, the term of this patent is extended or adjusted under 35 U.S.C. 154(b) by 184 days.

(21) Appl. No.: 18/757,089

(22) Filed: Jun. 27, 2024

(65) Prior Publication Data

US 2026/0006357 A1 Jan. 1, 2026

(51) Int. Cl.
*H04R 1/24* (2006.01)
*H04R 1/02* (2006.01)
*H04R 5/02* (2006.01)

(52) U.S. Cl.
CPC ............... *H04R 1/025* (2013.01); *H04R 1/24* (2013.01); *H04R 5/02* (2013.01); *H04R 2499/13* (2013.01)

(58) Field of Classification Search
CPC . H04R 1/025; H04R 1/24; H04R 5/02; H04R 2499/13
See application file for complete search history.

(56) References Cited

U.S. PATENT DOCUMENTS

| | | | | |
|---|---|---|---|---|
| 9,799,321 | B2 | 10/2017 | Nesbit, Jr. et al. | |
| 10,241,746 | B2 | 3/2019 | Sheedy et al. | |
| 10,362,389 | B2 | 7/2019 | Proni et al. | |
| 10,674,252 | B2 | 6/2020 | Proni et al. | |
| 10,922,045 | B2 | 2/2021 | Sheedy et al. | |
| 11,223,886 | B1 * | 1/2022 | Fadul | H04R 1/023 |
| 11,301,205 | B2 | 4/2022 | Sheedy et al. | |
| 11,630,638 | B2 | 4/2023 | Sheedy et al. | |
| 2013/0043089 | A1 | 2/2013 | Rodgers | |
| 2017/0267138 | A1 | 9/2017 | Subat et al. | |
| 2023/0254654 | A1 | 8/2023 | Vautin et al. | |
| 2023/0335106 | A1 * | 10/2023 | Hamme | G01H 3/08 |

* cited by examiner

*Primary Examiner* — Suhan Ni
(74) *Attorney, Agent, or Firm* — Merchant & Gould P.C.

(57) ABSTRACT

The present disclosure is directed towards a boat speaker system. In one example embodiment, a speaker system for a boat includes a first speaker enclosure. The first speaker enclosure has a first speaker opening, a second speaker opening, and a third speaker opening. The speaker system further includes a second speaker enclosure. The second speaker enclosure has a fourth speaker opening, a fifth speaker opening and a sixth speaker opening. The speaker system further includes a boat tower. The speaker system further includes a first ported enclosure having a first full-range speaker opening constructed to receive a first full-range speaker and a speaker port located on the front, back, or a side of the first ported enclosure.

12 Claims, 19 Drawing Sheets

BOAT SPEAKER SYSTEM

TECHNICAL FIELD

Example embodiments described herein relate generally to speaker systems, and more particularly to a speaker system for a boat.

BACKGROUND

Boating is a popular hobby. Many people drive watercrafts on lakes, rivers, the ocean, and other bodies of water for fun and to enjoy outside nature. Further, watercrafts can be used for many water sports. For example, wake boats often include a tower for towing a participant that is using a wakeboard, ski, or other towable instruments. The tower provides an upward angle, which is ideal for providing an upward force for the participant to rise from the water.

In addition, many boaters enjoy listening to music while out on the water. Some people bring a portable speaker with their boat so they can listen to music. Other watercrafts include built in speakers that connect to a radio or other music source included with the watercraft. Unfortunately, typical built-in speakers are placed in locations that result in suboptimal sounds for certain areas. The angles and placement of the speakers result in either quiet spots or noisy areas that the sound is not clear or optimally sounding.

Wake boats and installed speaker systems also face many environmental factors that can affect the listening experience. For example, wind noise and engine noise can overpower the audio system as well. In addition, wake boats have limited space for mounting speakers and amplifiers, making it challenging to achieve ideal speaker placement and sound dispersion.

SUMMARY

In accordance with the present disclosure, the above considerations and other issues are addressed.

In one embodiment, a speaker system for a boat includes a first speaker enclosure. The first speaker enclosure has a first speaker opening, a second speaker opening, and a third speaker opening. The first speaker opening is constructed to receive a first driver having a first central axis. The second speaker opening is constructed to receive a second driver having a second central axis. The third speaker opening is constructed to receive a third driver having a third central axis. When the first driver, the second driver, and the third driver are installed to the first speaker opening, the second speaker opening, and the third speaker opening, the second central axis is at a first angle relative to the first central axis, and the third central axis is at a second angle relative to the first central axis. The first central axis extends towards a first helm, the second central axis extends towards a second helm, and the third central axis extends outboard of the boat.

In some embodiments, the first angle is substantially forty-five degrees, and the second angle is substantially forty-five degrees. In some embodiments, the speaker system further includes the first driver, the second driver, and the third driver. In some embodiments, the first driver is a high-range speaker, the second driver is a mid-range speaker, and the third driver is a mid-range speaker. In some embodiments, the first driver, the second driver, and the third driver are each configured to receive an independent digital signal processing channel. In some embodiments, the speaker system further includes a first ported enclosure having a first full-range speaker opening constructed to receive a first full-range speaker and a speaker port located on the front, back, or a side of the first ported enclosure. The first subwoofer enclosure is bonded into a starboard wall of the boat. In some embodiments, the speaker system further includes a second speaker enclosure. The second speaker enclosure has a fourth speaker opening, a fifth speaker opening, and a sixth speaker opening. The fourth speaker opening is constructed to receive a fourth driver having a fourth central axis, the fifth speaker opening is constructed to receive a fifth driver having a fifth central axis, and the sixth speaker opening is constructed to receive a sixth driver having a sixth central axis. When the fourth driver, the fifth driver, and the sixth driver are installed to the fourth speaker opening, the fifth speaker opening, and the sixth speaker opening, the fifth central axis is at a third angle relative to the fourth central axis, and the sixth central axis is at a fourth angle relative to the fourth central axis. The fourth central axis extends towards the second helm, the fifth central axis extends towards the first helm, and the sixth central axis extends outboard of the boat. In some embodiments, the first speaker enclosure is built into a dash of the boat or a glovebox of the boat. In some embodiments, the speaker system further includes a boat tower. The boat tower includes a first mounting foot configured to attach to the boat and a first vertical support coupled to the first mounting foot. The boat tower further includes a first vertical support that includes a vertical service and one or more speaker openings within the vertical surface of the first vertical support. The one or more speaker openings are constructed to receive one or more drivers. The first vertical surface faces inboard. In some embodiments, the speaker system further includes the one or more drivers. The one or more drivers each include a central axis extending at an angle substantially perpendicular to the vertical surface when received by the first speaker opening, the second speaker opening, and the third speaker opening.

In some embodiments, a speaker system for a boat includes a boat tower. The boat tower includes a first mounting foot configured to attach to the boat and a first vertical support coupled to the first mounting foot. The first vertical support includes a vertical surface. The boat tower further includes a first speaker opening, a second speaker opening, and a third speaker opening within the vertical surface of the first vertical support. The first speaker opening, the second speaker opening, and the third speaker opening are constructed to receive a first driver, a second driver, and a third driver. The first vertical surface faces inboard.

In some embodiments, the speaker system further includes the first driver, the second driver, and the third driver. The first driver, the second driver, and the third driver are directed at an angle substantially perpendicular to the vertical surface when received by the first speaker opening, the second speaker opening, and the third speaker opening. In some embodiments, the first driver, the second driver, and the third driver are actively powered by a digital signal processor. In some embodiments, the first driver is a high-range speaker, and the second driver and the third driver are mid-range speakers. In some embodiments, the first driver, the second driver, and the third driver are directed within the boat when received by the first speaker opening, the second speaker opening, and the third speaker opening. In some embodiments, the speaker system further includes a first ported enclosure. The first ported enclosure includes a first full-range speaker opening constructed to receive a first full-range speaker and a speaker port located on the front, back, or a side of the first ported enclosure. The first ported enclosure being bonded into a starboard wall of the boat. In some embodiments, the boat tower further includes a second mounting foot configured to attach to the boat and a second vertical support coupled to the second mounting foot. The second vertical support configured to connect to the boat. The boat tower further includes a fourth speaker opening, a fifth speaker opening, and a sixth speaker opening within the second vertical surface of the second vertical support. The fourth speaker opening, the fifth speaker opening, and the sixth speaker opening are constructed to receive a fourth driver, a fifth driver, and a sixth driver. The second vertical surface faces inboard. In some embodiments, the speaker system further includes a first speaker enclosure. The first speaker enclosure has a fourth speaker opening, a fifth speaker opening and a sixth speaker opening. The fourth speaker opening is constructed to receive a fourth driver having a first central axis, the fifth speaker opening is constructed to receive a fifth driver having a second central axis, and the sixth speaker opening is constructed to receive a sixth driver having a third central axis. When the fourth driver, the fifth driver, and the sixth driver are installed to the fourth speaker opening, the fifth speaker opening, and the sixth speaker opening, the second central axis is at a first angle relative to the first central axis, and the third central axis is at a second angle relative to the first central axis. The first central axis extends towards a first helm, the second central axis extends towards a second helm, and the third central axis extends outboard of the boat.

In some embodiments, a speaker system for a boat includes a first speaker enclosure. The first speaker enclosure has a first speaker opening, a second speaker opening, and a third speaker opening. The first speaker opening is constructed to receive a first driver having a first central axis, the second speaker opening is constructed to receive a second driver having a second central axis, and the third speaker opening is constructed to receive a third driver having a third central axis. When the first driver, the second driver, and the third driver are installed to the first speaker opening, the second speaker opening, and the third speaker opening, the second central axis is at a first angle relative to the first central axis, and the third central axis is at a second angle relative to the first central axis. The first central axis extends towards a first helm, the second central axis extends towards a second helm, and the third central axis extends outboard of the boat. The speaker system further includes a second speaker enclosure. The second speaker enclosure has a fourth speaker opening, a fifth speaker opening, and a sixth speaker opening. The fourth speaker opening is constructed to receive a fourth driver having a fourth central axis, the fifth speaker opening is constructed to receive a fifth driver having a fifth central axis, and the sixth speaker opening is constructed to receive a sixth driver having a sixth central axis. When the fourth driver, the fifth driver, and the sixth driver are installed to the fourth speaker opening, the fifth speaker opening, and the sixth speaker opening, the fifth central axis is at a third angle relative to the fourth central axis, and the sixth central axis is at a fourth angle relative to the fourth central axis. The fourth central axis extends towards the second helm, the fifth central axis extends towards the first helm, and the sixth central axis extends outboard of the boat. The speaker system further includes a boat tower. The boat tower includes a first mounting foot and a second mount foot. The first mount foot and the second mounting foot are configured to attach to the boat. The boat tower further includes a first vertical support coupled to the first mounting foot. The first vertical support includes a vertical surface, a seventh speaker opening, an eighth speaker opening, and a ninth speaker opening within the vertical surface of the first vertical support. The seventh speaker opening, the eighth speaker opening, and the ninth speaker opening are constructed to receive a seventh driver, an eighth driver, and a ninth driver. The boat tower further includes a second vertical support including a second vertical surface. The second vertical support is coupled to the second mounting foot. The boat tower further includes a tenth speaker opening, an eleventh speaker opening, and a twelfth speaker opening within the second vertical surface of the second vertical support. The tenth speaker opening, the eleventh speaker opening, and the twelfth speaker opening are constructed to receive a tenth driver, an eleventh driver, and a twelfth driver. The speaker system further includes a first ported enclosure having a first full-range speaker opening constructed to receive a first full-range speaker and a speaker port located on the front, back, or a side of the first ported enclosure. The first ported enclosure is bonded into a starboard wall of the boat.

In some embodiments, the speaker system further includes a digital signal processor configured to actively power one or more drivers when the one or more drivers are received by the first speaker opening, the second speaker opening, the third speaker opening, the forth speaker opening, the fifth speaker opening, the sixth speaker opening, the seventh speaker opening, the eighth speaker opening, the ninth speaker opening, the tenth speaker opening, the eleventh speaker opening, the twelfth speaker opening, or the first full-range speaker opening.

BRIEF DESCRIPTION OF THE DRAWINGS

Non-limiting and non-exhaustive examples are described with reference to the following figures.

DETAILED DESCRIPTION

Figure 1:
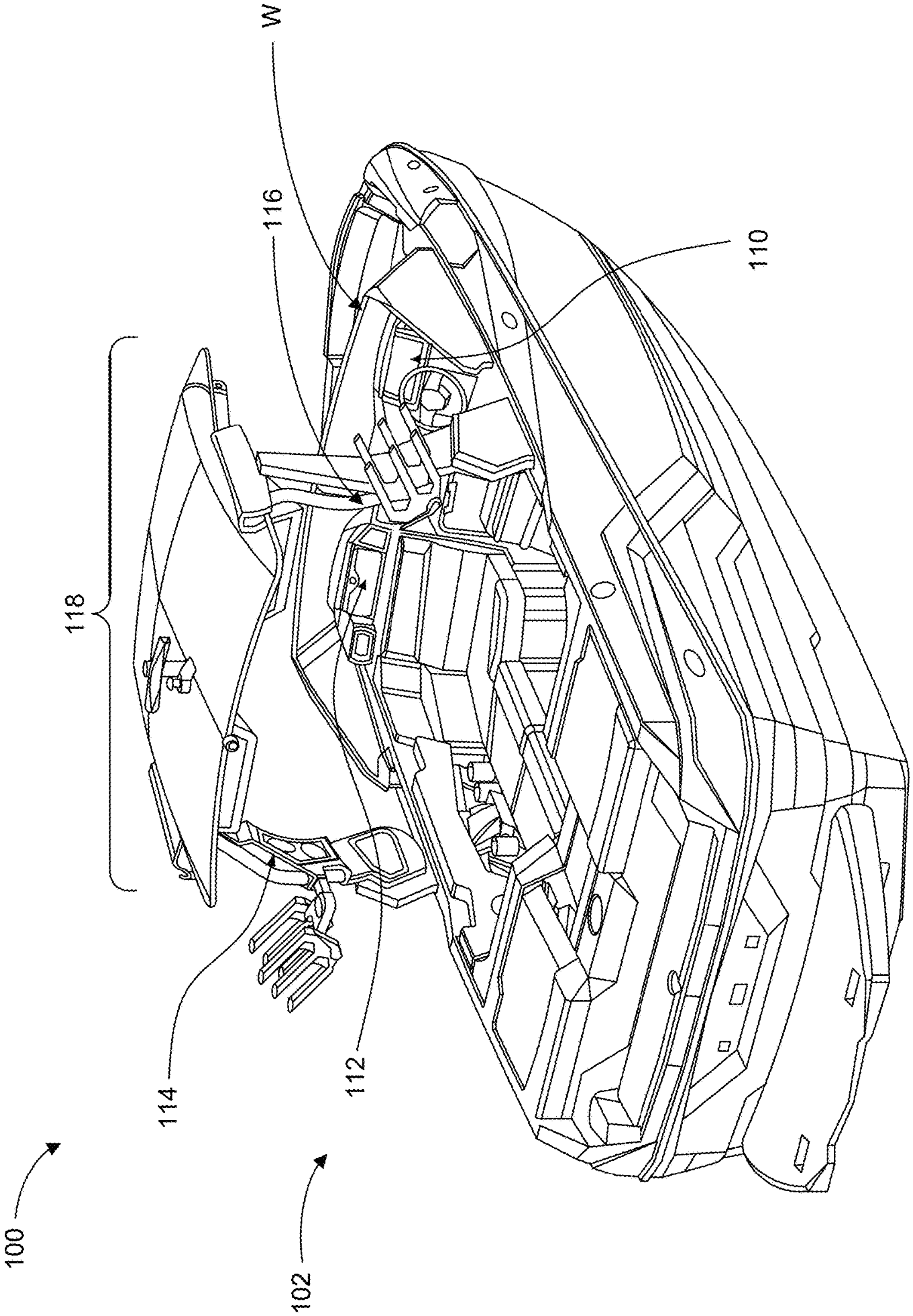
FIG. 1 illustrates a perspective view of a boat speaker system in accordance with an example embodiment.

This description is not intended to limit the application of the example embodiments presented herein. In fact, after reading the following description, it will be apparent to one skilled in the relevant art(s) how to implement the following example embodiments in alternative embodiments. In addition, not all of the components described herein are required to practice the disclosed systems, devices or methods, and variations in the arrangement and type of the components may be made without departing from the spirit or scope of the disclosure.

In the several drawings, like numbers refer to like components.

Some terms are defined below for easy reference. However, it should be understood that the defined terms are not rigidly restricted to their definitions. A term may be further defined by its use in other sections of this description.

Filling an open-air environment with sound faces many challenges. Achieving high-quality sound in such a setting presents even greater challenges. A technical challenge in filling an open-air environment with sound, particularly when aiming for high quality, is determining the optimal placement and gain settings to effectively fill the boat with sound. Reflections occur when sound waves bounce off surfaces, such as walls, in a closed environment. In an open-air environment, there are fewer structures to reflect sound.

In an open-air setting, sound can be influenced by factors like wind or distance. Wind noise, for example, can contribute to overpowering the speaker output, especially when the boat is moving. As the boat moves through the body of water and open air, the sound of the air rushing by the boat creates a loud noise that can easily overpower any music that is playing.

Accordingly, speaker placement is paramount for an optimal listening experience. A speaker zone (also called an "audio zone") refers to a defined area or region within a space where audio is delivered by specific speakers or speaker systems. Speaker zones are typically designed to optimize sound distribution and quality for different areas or sections of a room, vehicle, or any environment where audio is being reproduced. In the context of a boat or marine environment, speaker zones could correspond to different sections such as the bow (front area), stern (rear area), cockpit, or other designated areas where speakers are strategically placed to provide optimal audio coverage. Each speaker zone may have its own set of speakers (also referred to as speaker drivers) that are tuned and positioned to deliver sound effectively within that particular zone, contributing to an immersive audio experience tailored to different parts of the space or vessel. Aspects of the embodiments described herein, arrange speaker drivers to create particular audio zones.

Tuning refers to the adjustment of the audio output characteristics, such as equalization, frequency response, and phase alignment, to optimize sound quality and performance for the specific acoustic environment within the boat. In some embodiments, the speaker system optimizes speaker positioning and enables precise tuning to achieve improved sound quality.

A helm position refers to the location on a boat or ship where the steering controls are located. This position is usually associated with a steering wheel or tiller and is where the helmsman, the person responsible for steering the vessel, operates. The helm position typically includes various controls and instruments necessary for navigation, such as a compass, throttle controls, and electronic navigation aids.

In some embodiments of the present disclosure, the speaker system includes a helm speaker component having speaker drivers positioned such that at least one acoustic axis (also referred to as directional output or a central axis) is aimed directly at a driver seat of the boat. In an example embodiment, the speaker drivers are position such that at least one acoustic axis is directed at least as high as the top half of the driver's seat. In some embodiments, the helm speaker component has speaker drivers positioned such that at least one acoustic axis is aimed directly at a helm passenger seat of the boat. In an example embodiment, at least one speaker driver is positioned such that at least one acoustic axis is directed at least as high as the top half of the helm passenger seat. Thus, the helm speaker component emits sound aimed directly at the driver and the helm passenger.

For a speaker, "on-axis" refers to the listening position directly in front of the speaker, aligned with the center of the speaker driver (where the sound is produced). It is the axis along which the speaker is designed to radiate sound most directly and accurately. As described in more detail below, in some embodiments, rather than reflecting sound off a windshield, the driver helm position or passenger helm position is on-axis for at least one of the speaker drivers of the helm speaker component.

Wind flow along the edges of a boat's windshield can generate significant noise, often overpowering audio output from speaker systems. This can result in the sound of the wind drowning out, for example, music. This presents a challenge in the optimal placement of speaker drivers to mitigate this issue. The dashboard and glovebox areas provide unused space that can be leveraged for this purpose. Embodiments of the present design exploit these areas to strategically position speaker drivers. In one exemplary embodiment, one or more speaker drivers are oriented to direct sound towards the areas where wind turbulence occurs (e.g., along the edges of the windshield), which has been found to enhance audio clarity despite wind noise interference. Additional speaker drivers of the helm speaker component also can be directed inboard and outboard to expand the audio zone of the helm speaker component and overcome wind noise around the windshield while the boat is in motion.

A wakeboard tower is a structural component mounted to boat, designed to withstand various mechanical stressors, and primarily intended to elevate a tow point for wakeboarding and other water sports. The support legs of the frame, which in some embodiments, attach to a gunwale of a boat's hull, contain internal space that is typically unused except for structural support and has not been used as a speaker enclosure. A gunwale is a top edge of the boat's hull, usually where the deck and hull meet. Gunwale is sometimes referred to as a gunwhale or gunnel.

In some embodiments, the speaker system includes tower speakers placed within the vertical surfaces of the structural components of a wakeboard tower. The support legs, which are typically used only for structural integrity, are utilized as enclosures for additional speaker systems. This integration, in some embodiments, involves embedding the speaker drivers into the surfaces of the support legs.

To achieve this, the support legs are constructed to house the speaker drivers within their vertical surfaces. In an example, one or more cavities or recesses (referred to collectively as cavities) in the support legs are formed such that the speakers can be securely mounted thereto. The speakers are then installed in these cavities, with appropriate acoustic treatments and sealing to ensure optimal sound quality and protection from environmental factors.

The tower speaker components are strategically positioned within these surfaces to direct sound inboard, thereby creating an additional audio zone that immerses the area below the tower in sound. This inboard directionality ensures that the audio from the tower speakers is concentrated below the tower, enhancing the listening experience for passengers in that area.

Additionally, the placement of the speakers at a certain height on the tower helps counteract wind noise generated by the boat's movement. In an example embodiment, a height from a bottom of the tower speaker component is between zero to seventy-two inches from the gunwale of the boat. By elevating the speakers, they are less affected by the turbulence and noise near the boat's deck, resulting in clearer and more consistent audio output.

This innovative use of the support legs as speaker enclosures not only provides robust structural support but also maximizes space efficiency within the boat. By integrating the speakers into the tower, valuable interior space is preserved, allowing for more flexible and uncluttered boat design.

A full-range speaker as used herein refers generally to a speaker driver that is designed to reproduce a wide range of frequencies within a single speaker unit. It is capable of reproducing both low and high frequencies without the need for additional speaker drivers (such as tweeters or subwoofers) dedicated to specific frequency ranges. Full range speakers aim to provide a balanced sound across the entire audible frequency spectrum, from bass to treble, within the capabilities of the single speaker unit.

A ported speaker enclosure, also known as a bass reflex enclosure, is a specialized design used in loudspeakers and subwoofers to enhance bass performance. Unlike sealed enclosures which are airtight, ported enclosures feature a vent or port that allows internal air to escape. This port is typically a tube or duct that opens to the external environment. The design works on the principle of acoustic resonance, where the ported enclosure uses the air movement through the port to reinforce low-frequency sound waves produced by the speaker driver. This results in improved efficiency and extended bass response compared to sealed enclosures. Ported enclosures are favored in applications where deep, powerful bass is desired, such as in home audio systems, car audio setups, and professional sound reinforcement. Because design considerations like port size and enclosure dimensions are critical in achieving optimal bass performance without compromising overall sound quality, ported speaker enclosures in boats are typically not tuned in the case where the boat itself is, in part, the speaker enclosure. Nor are boats typically designed to strategically incorporate ports.

In some embodiments, the speaker system includes a ported enclosure component. In an example implementation, the ported enclosure component houses a full-range speaker. The ported enclosure component features a speaker port that creates an open pathway for sound to travel from an enclosure of the ported enclosure component to the boat's cockpit. For instance, the port could be conveniently located on the side of the boat near various points such as near a cup holder, or beside a seating area. Additionally, the ported enclosure component is securely mounted within the siding of the boat, optimizing space in the cockpit.

Additionally, each component of the speaker system—the helm speaker, tower speaker, and ported enclosure—is tuned to mitigate vibrations from the boat and the open-air environment. This tuning involves adjusting the speaker drivers to filter out specific frequencies that may arise as noise from external sources, such as vibrations caused by the boat's motor. Each speaker is also tuned to emit sound at frequencies that optimize its performance within its designated audio zone and contribute to the overall sound quality throughout the boat. In some embodiments, each speaker is powered by an amplifier housed within the boat, which includes dedicated channels for delivering amplified audio signals to each speaker. The boat's audio system incorporates a digital signal processor (DSP) that receives audio input signals, such as from a radio, and distributes tailored signals to each speaker based on programmed outputs. The DSP enhances sound quality, applies effects like equalization and noise reduction, and facilitates tasks such as audio format decoding and mixing. For instance, the passenger helm speaker component may receive left channel signals from an audio source, while the driver helm speaker component receives right channel signals, creating a stereo sound effect.

In some embodiments, measuring and tuning the speaker components in a boat involves a process aimed at achieving optimal audio performance tailored to the unique acoustic environment onboard. Utilizing measurement tools such as calibrated microphones, spectrum analyzers, and RTA software, technicians gather data across different areas like the cockpit, helm, and cabin. These measurements provide insights into the boat's acoustic characteristics, including frequency response, resonance points, and areas of sound reflection or absorption. Analysis of the frequency response of each speaker component informs adjustments to ensure balanced reproduction of lows, mids, and highs. Equalization techniques are applied through digital signal processing to flatten frequency response and compensate for any acoustic anomalies. Crossover frequencies and slopes are optimized based on measurements to ensure integration between speakers, minimizing frequency overlap. Phase and time alignment adjustments further enhance coherence and imaging, ensuring that sound from multiple speakers arrives at the listener's position simultaneously and with clarity. Power matching ensures that each speaker receives adequate amplification tailored to its specifications, thus optimizing efficiency and preventing distortion. The tuning process can be validated through both objective measurements and subjective listening tests in various operational conditions, ensuring consistent, high-fidelity sound performance throughout the boat.

Figure 2:
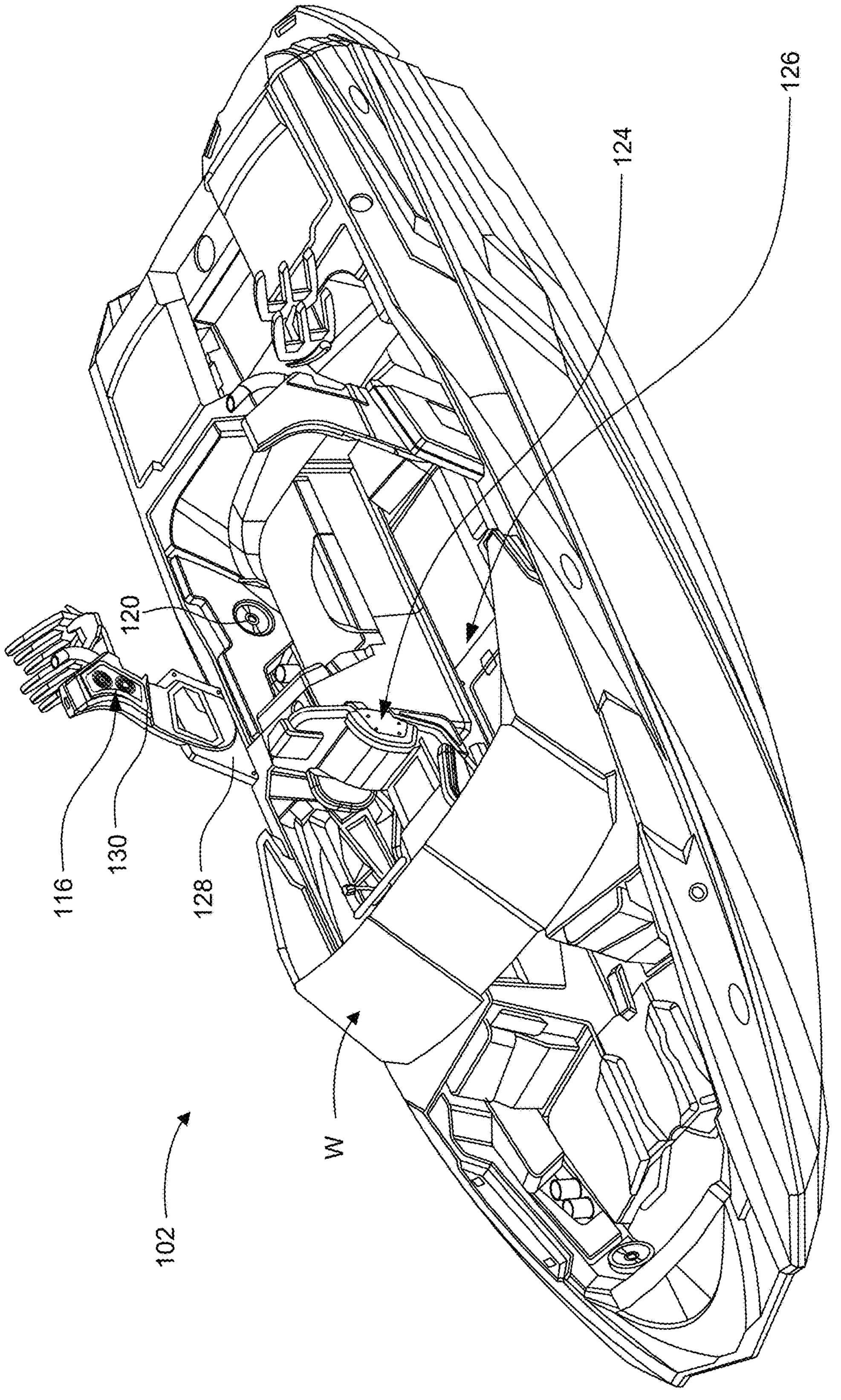
FIG. 2 illustrates a second perspective view of the example boat speaker system of FIG. 1.
Figure 3:
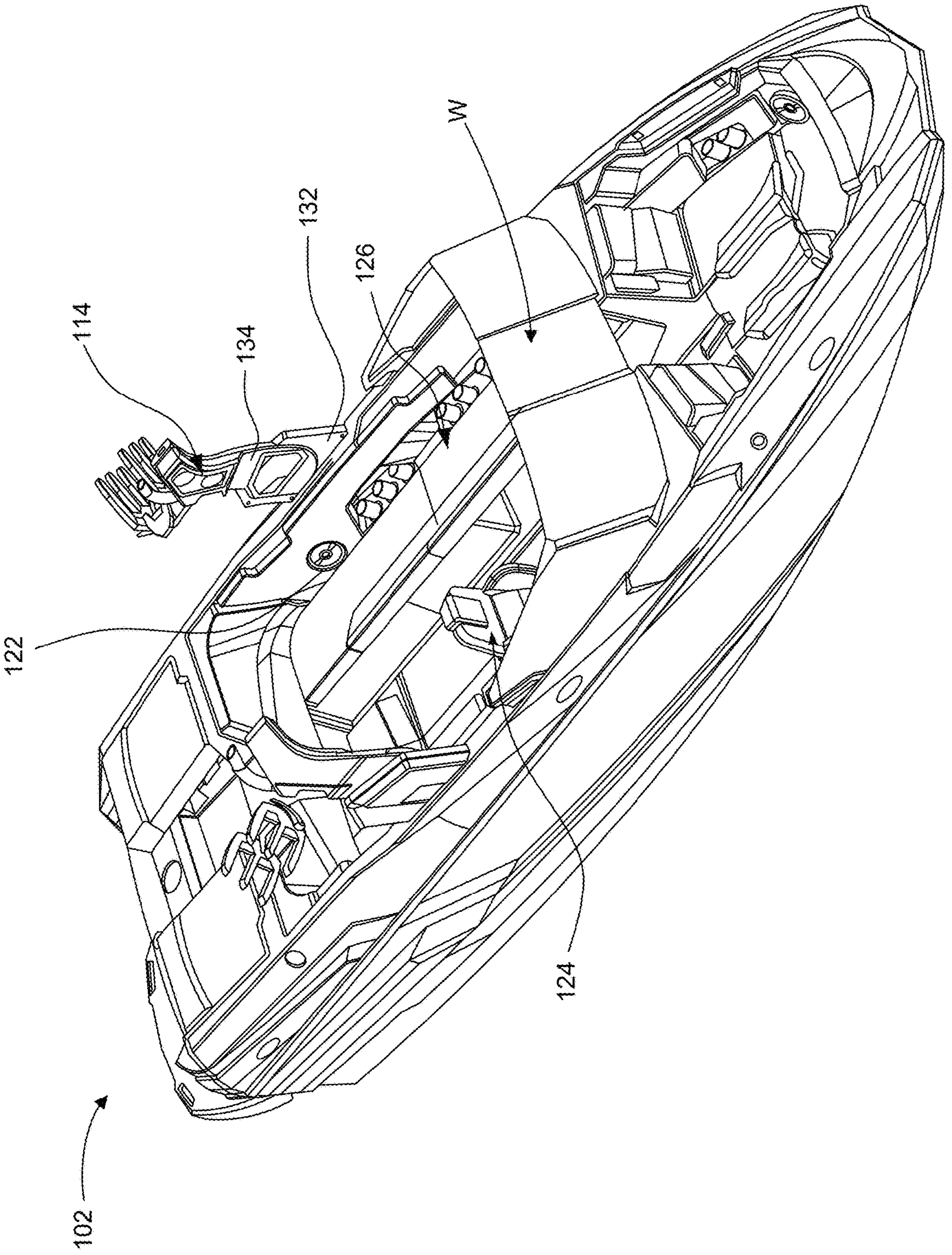
FIG. 3 illustrates a third perspective view of the example boat speaker system of FIG. 1.
Figure 4:
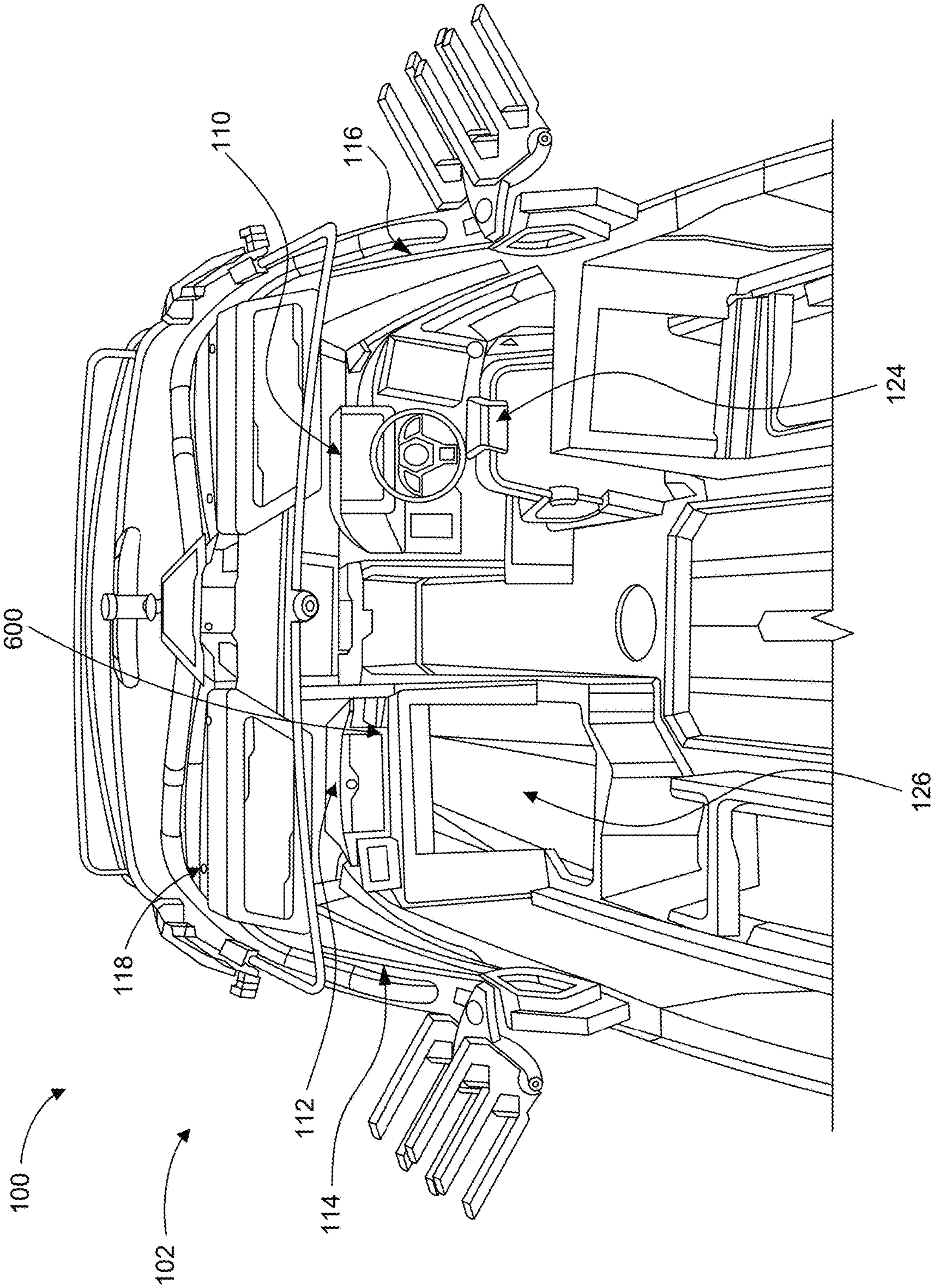
FIG. 4 illustrates a fourth perspective view of the example boat speaker system of FIG. 1.

FIG. 1 illustrates a perspective view of a boat speaker system in accordance with an example embodiment. FIG. 2 illustrates a second perspective view of the example boat speaker system of FIG. 1. FIG. 3 illustrates a third perspective view of the example boat speaker system of FIG. 1. FIG. 4 illustrates a fourth perspective view of the example boat speaker system of FIG. 1.

Referring to FIG. 1, FIG. 2, FIG. 3, and FIG. 4, an example embodiment of a boat 100 with a speaker system

102 is shown. Due to its enclosures and mechanical components, the boat 100 can be considered, in part, as a speaker system 102. The speaker system 102 includes a driver helm speaker component 110, a passenger helm speaker component 112, a port tower speaker component 114, a starboard tower speaker component 116, a starboard ported enclosure speaker component 120, and a port ported enclosure speaker component 122.

The driver helm speaker component 110 and passenger helm speaker component 112 are placed adjacent to a driver helm position 124 and a passenger helm position 126, respectively. The driver helm speaker component 110 is also referred to as a driver-side helm speaker component 110 or first helm speaker component 110, and passenger helm speaker component 112 is also referred to as a passenger-side helm speaker component 112 or second helm speaker component 112.

In some embodiments, the driver helm speaker component 110 and passenger helm speaker component 112 direct emitted sound from included speaker drivers towards the driver helm position 124 and passenger helm position 126 without directly reflecting sound off a windshield W.

In some embodiments, the driver helm speaker component 110 and the passenger helm speaker component 112 direct emitted sound from included speaker drivers towards the driver helm position 124 and passenger helm position 126 primarily without reflecting sound off a windshield. In some embodiments, emitted sound reflected off the windshield is insubstantial.

Further, both the driver helm speaker component 110 and the passenger helm speaker component 112 direct sound inboard and outboard of the boat 100. In some embodiments, a DSP 600 directs different aspects of the sound to different speaker systems. “Left sound” refers to the audio channel intended for the left side of a stereo field, while “right sound” refers to the audio channel intended for the right side of the stereo field. In some embodiments, the passenger helm speaker component 112 plays left sound while the driver helm speaker component 110 plays right sound. In an example implementation, the driver helm speaker driver component 110 and the passenger helm speaker driver 112 are positioned within the dashboard and glovebox in front of the driver helm position 124 and the passenger helm position 126, respectively. Openings in the driver helm speaker component 110 and the passenger helm speaker component 112 allow sound from the included speaker drivers to flow.

As explained above, “tuning” refers to the adjustment of the audio output characteristics, such as equalization, frequency response, and phase alignment, to optimize sound quality and performance for the specific acoustic environment within the boat. In some embodiments, DSP 600 controls the tuning of each of the speaker drivers.

In some embodiments, the tower speaker drivers are housed within a vertical surface of a tower 118. “Housed” as used herein generally means positioned or installed within a specific part. In an example implementation, the tower 118 includes a starboard support leg 130 and a port support leg 134. The starboard support leg 130 attaches to the boat 100 with a starboard mounting foot 128 and the port support leg 134 attaches to the boat 100 with a port mounting foot 132. The starboard support leg 130 and the port support leg 134 provide the structure that keeps the tower 118 upright. Both the starboard support leg 130 and the port support leg 134 are constructed to withstand the intense winds of moving through the water at high speeds. Further, the starboard support leg 130 and port support leg 134 are constructed to withstand the force of towing a skier or wakeboarder behind the boat while moving. In some embodiments, the starboard support leg 130 and port support leg 134 are made of a metal frame. In some embodiments, the starboard support leg 130 and port support leg 134 include an outer plastic layer that surrounds load-bearing beams or poles that support the tower 118. In addition, the tower 118 may include a central attachment piece for towing a skier, wake boarder, or tube for water sports. The starboard support leg 130 and the port support leg 134 are constructed such that the tower 118 can withstand the force of towing. The starboard mounting foot 128 and the port mounting foot 132 attach to the boat 100. In some embodiments, the starboard mounting foot 128 and the port mounting foot 132 attach to the gunwale of the boat 100. In some embodiments, the starboard mounting foot 128 and the port mounting foot 132 attach to the hull of the boat 100. In some embodiments, the starboard mounting foot 128 and the port mounting foot 132 attach to a point between the deck of the boat 100 and the gunwale. In some embodiments, the starboard mounting foot 128 and the port mounting foot 132 attach to the boat 100 by being welded to the side of the boat 100 or being bolted to the boat 100. Other attachment mechanisms can be used as well.

In some embodiments, the support leg 134 and the mounting foot 132 are a single integrated component. In some embodiments, the support leg 134, the mounting foot 132, and the port tower speaker component 114 other than the included speaker drivers are a single integrated component. In some embodiments, the support leg 130 and the mounting foot 128 are a single integrated component. In some embodiments, the support leg 130, the mounting foot 128, and the starboard tower speaker component 116 other than the included speaker drivers are a single integrated component.

Further, as shown, the port tower speaker component 114 and starboard tower speaker component 116 are pointed inboard towards the cabin. The port tower speaker component 114 and starboard tower speaker component 116 may be placed at a lower or higher position than shown in some embodiments. Further, the port tower speaker component 114 and starboard tower speaker component 116 can be arranged to point in different directions. Further, the port tower speaker component 114 and starboard tower speaker component 116 can include additional speaker systems that are arranged to point in a different direction. The port tower speaker component 114 is also referred to as first tower speaker component 114 and starboard tower speaker component 116 is also referred to as second tower speaker component 116.

Figure 5:
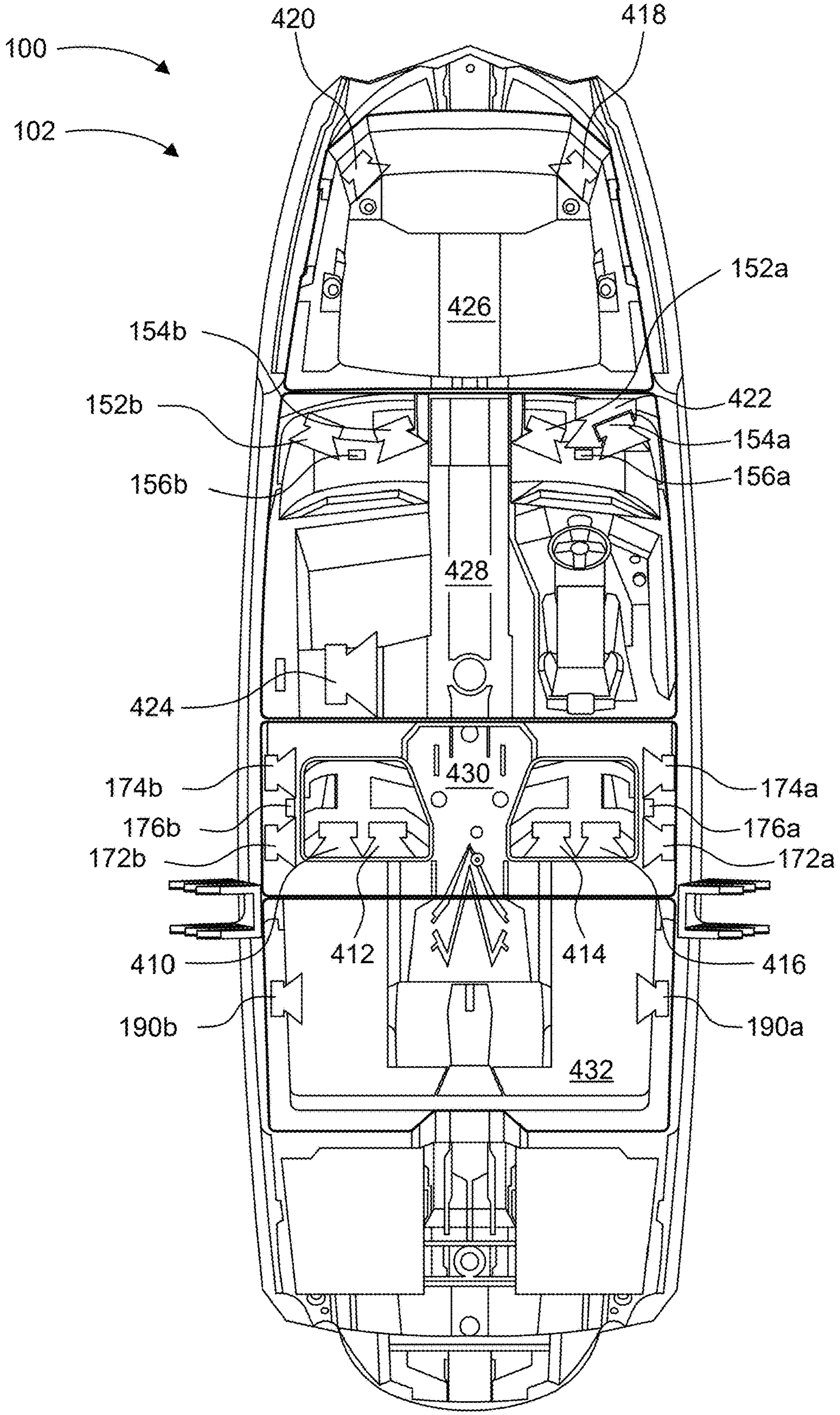
FIG. 5 illustrates speaker zones according to an example embodiment.

FIG. 5 illustrates speaker zones of the boat 100 of FIG. 1 according to an example embodiment. The speaker system 102 includes a first audio zone 426, a second audio zone 428, a third audio zone 430, and a fourth audio zone 432. Each of these zones, namely the first audio zone 426, the second audio zone 428, the third audio zone 430, and the fourth audio zone 432, includes one or more speaker drivers that are optimally tuned to create an immersive sound experience for the area within the corresponding zone.

The first audio zone 426 primarily encompasses the bow of the boat. The first audio zone 426 is produced by a first bow speaker driver 420 and a second bow speaker driver 418. The first bow speaker driver 420 and the second bow speaker driver 418 are housed within the sides of the boat 100 inside the front seating area of the boat 100. In some embodiments, the first audio zone 426 includes a boundary at the windshield of the boat 100.

The second audio zone 428 includes a driver inboard speaker driver 152*a*, passenger outboard speaker driver 152*b*, a driver outboard speaker driver 154*a*, a passenger inboard speaker driver 154*b*, a driver on-axis speaker driver 156*a*, a passenger on-axis speaker driver 156*b*, a first subwoofer driver 422, and a second subwoofer driver 424. The second audio zone 428 distributes sound generally towards the driver helm position 124 and the passenger helm position 126. Further, the lower-range frequencies, such as bass, produced by the first subwoofer driver 422 and the second subwoofer driver 424 carry to other audio zones. The angles of the driver inboard speaker driver 152*a*, the driver outboard speaker driver 154*a*, the passenger outboard speaker driver 152*b*, and the passenger inboard speaker driver 154*b* also contribute to distribution of sound throughout second audio zone 428. In some embodiments, the boarders of the second audio zone 428 include the area between the windshield of the boat 100 and the tower 118. In some embodiments, the borders of the second audio zone 428 extend beyond the sides of the boat 100.

The third audio zone 430 is primarily created by a first starboard tower speaker driver 172*a*, a first port tower speaker driver 172*b*, a second starboard tower speaker driver 174*a*, a second port tower speaker driver 174*b*, a third starboard tower speaker driver 176*a*, and a third port tower speaker driver 176*b*. The first starboard tower speaker driver 172*a*, the first port tower speaker driver 172*b*, the second starboard tower speaker driver 174*a*, the second port tower speaker driver 174*b*, the third starboard tower speaker driver 176*a*, and the third port tower speaker driver 176*b* are directed inboard and placed substantially above where occupants' heads are located to envelop the occupants in immersive sound. In an example implementation, the first starboard tower speaker driver 172*a*, the first port tower speaker driver 172*b*, the second starboard tower speaker driver 174*a*, the second port tower speaker driver 174*b*, the third starboard tower speaker driver 176*a*, and the third port tower speaker driver 176*b* are located at a height from a bottom 169 of the tower speaker component 114 and the tower speaker component 116, respectively. For example, the height is between zero to seventy-two inches from the gunwale of the boat 100 to the bottom 169 of the starboard speaker component 116. In some embodiments, the bottom 169 is twenty inches above the gunwale. In some embodiments, the bottom 169 is thirty-five inches above the gunwale. The third audio zone 430 includes the area under the tower 118.

The fourth audio zone 432 includes a starboard ported enclosure speaker driver 190*a* and a port ported enclosure speaker driver 190*b*. As shown, the fourth audio zone 432 encompasses the back seating area of the boat 100. In some embodiments, the tower 118 has attached a first additional speaker driver 410, a second additional speaker driver 412, a third additional speaker driver 414, and a fourth additional speaker driver 416. The first additional speaker driver 410, the second additional speaker driver 412, the third additional speaker driver 414, and the fourth additional speaker driver 416 may be hanging or installed to the top of the tower 118 and arranged to emit sound towards a skier while they are being towed.

While shown in specific zones, some of the speaker drivers may contribute to the sound of different zones. For example, bass from the first subwoofer driver 422 and second subwoofer driver 424 may provide the lower-frequency range of the audio signal to all audio zones.

Figure 6:
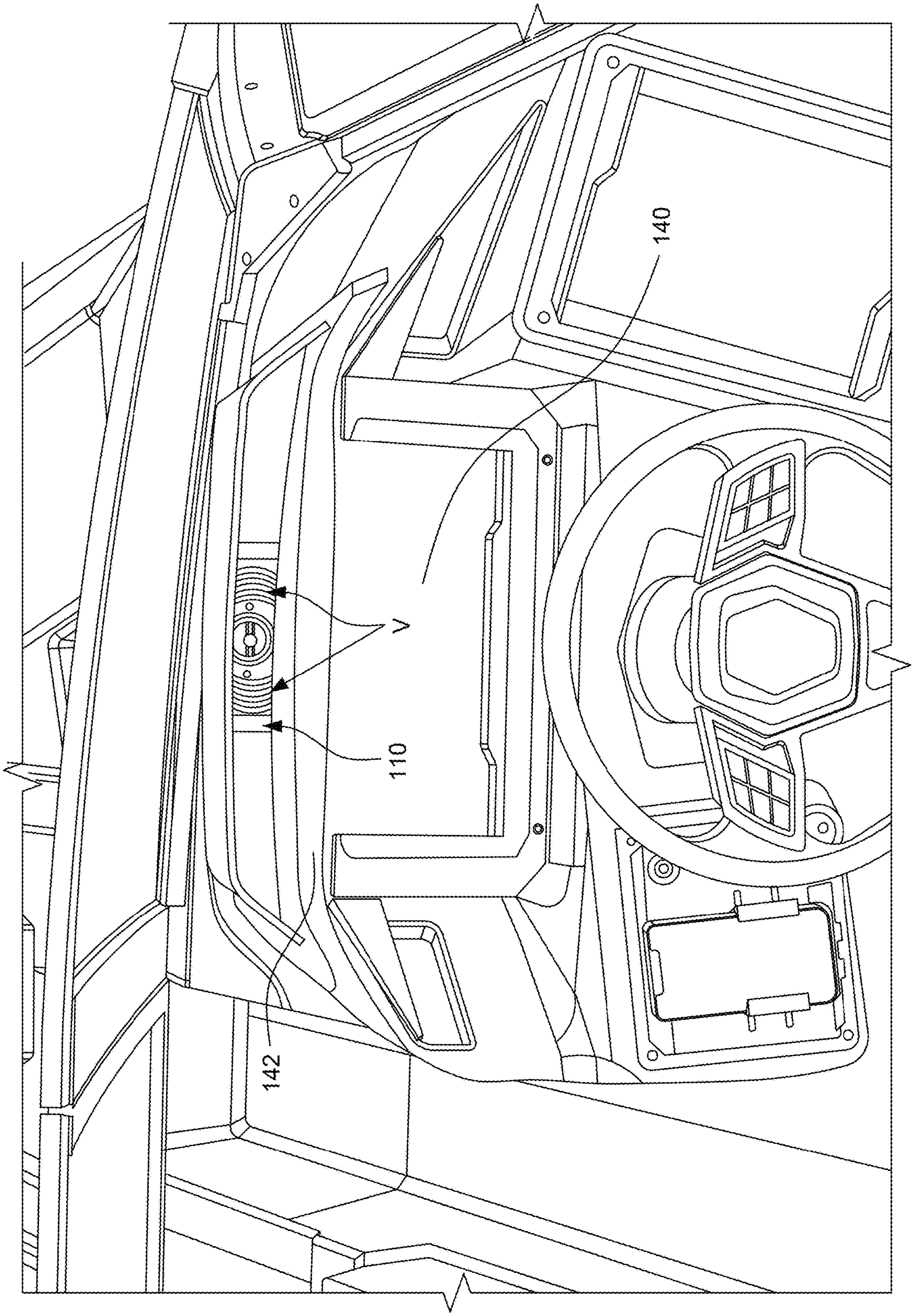
FIG. 6 illustrates a front view of a helm speaker component according to an example embodiment.
Figure 7:
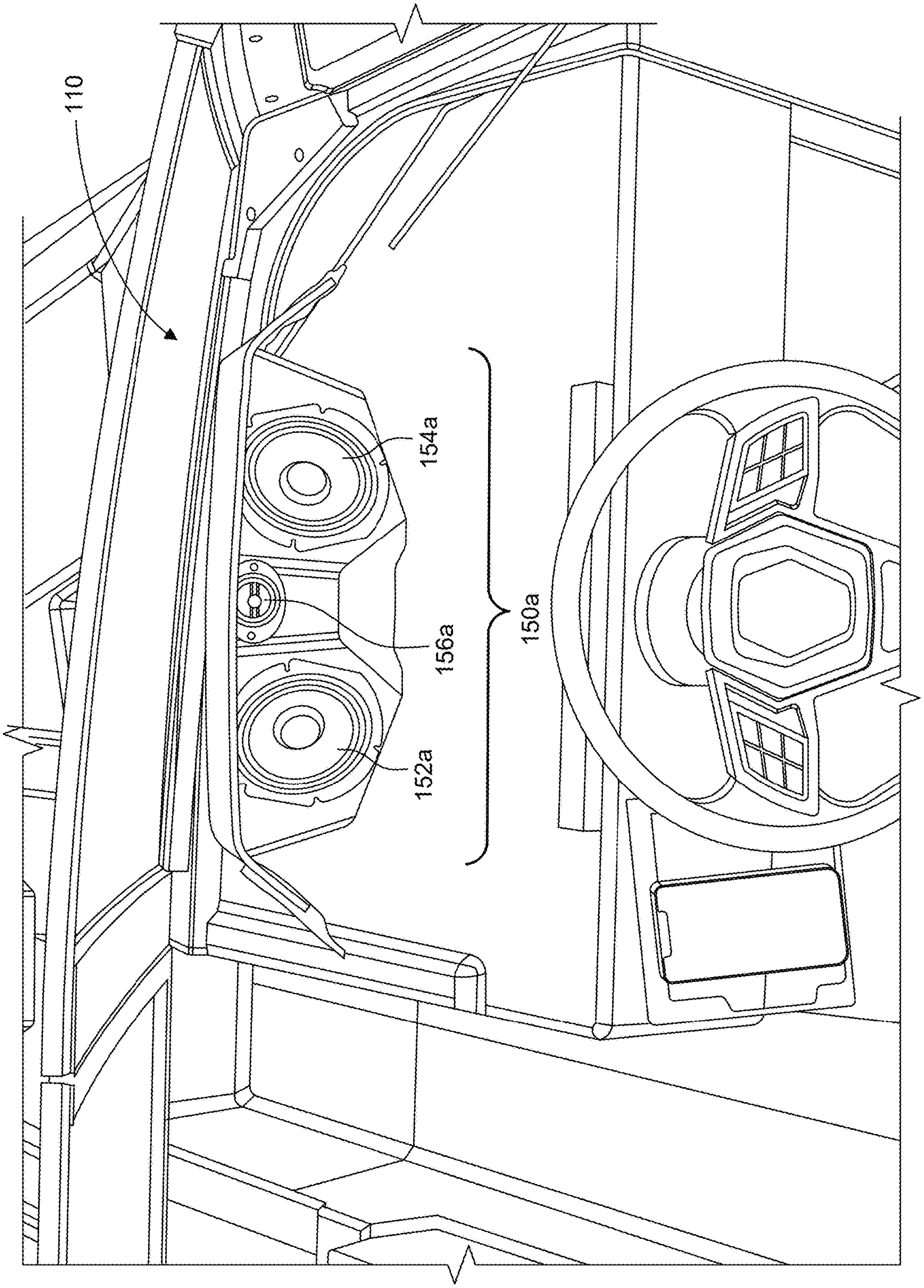
FIG. 7 illustrates a front view of the helm speaker component of FIG. 5 with a console removed.
Figure 8:
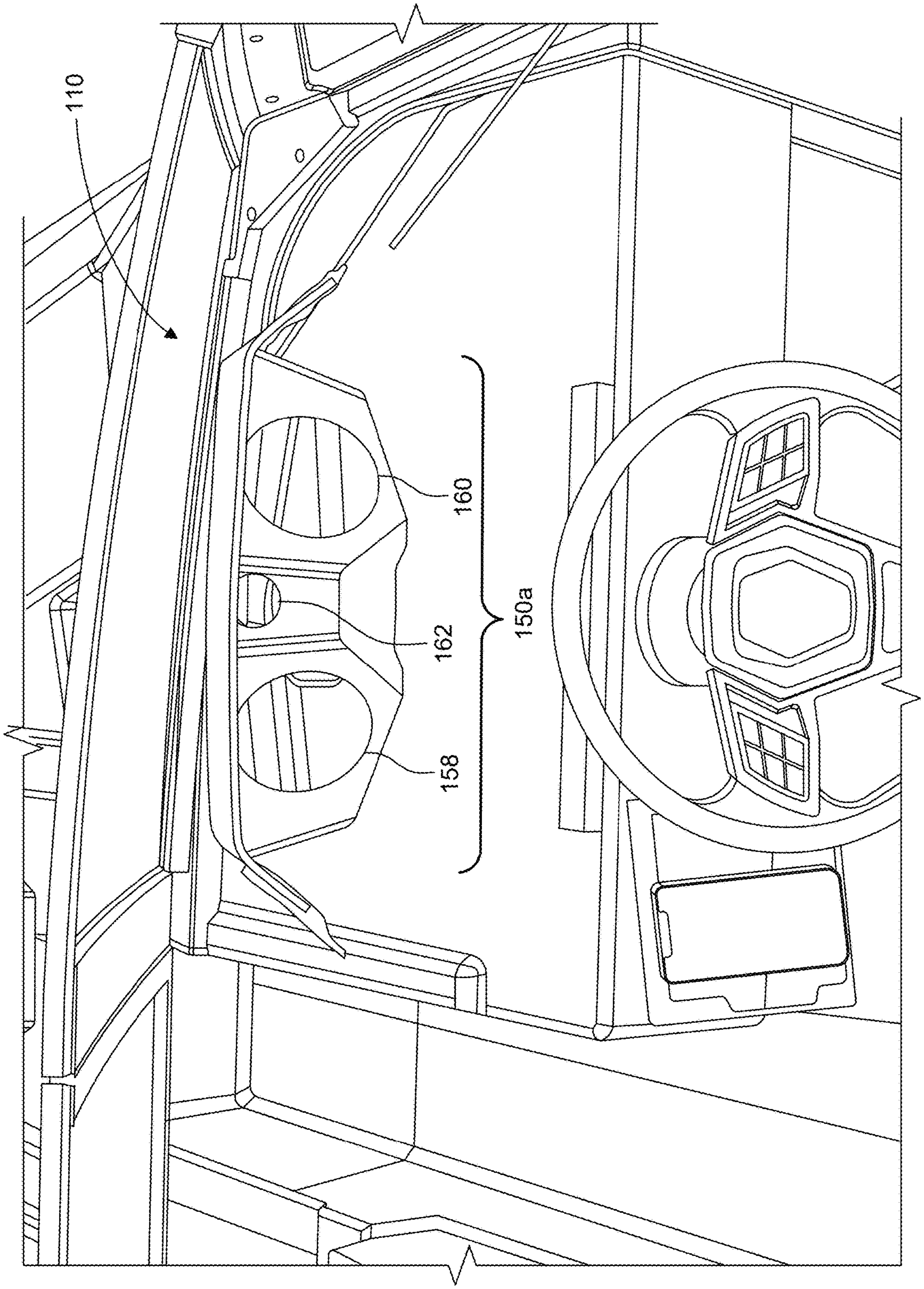
FIG. 8 illustrates a front view of a speaker enclosure of FIG. 6.

FIG. 6, FIG. 7, and FIG. 8 illustrate example components of a driver helm speaker component 110. Particularly, FIG. 6 illustrates a front view of a helm speaker component according to an example embodiment, FIG. 7 illustrates a front view of the helm speaker component of FIG. 5 with a console removed, and FIG. 8 illustrates a front view of a speaker enclosure of FIG. 6.

Referring to FIG. 6, in an example implementation, a driver helm speaker component 110 is installed behind a dash 140 and a frame 142, where the frame 142 holds the dash 140 in place. In the example implementation shown in FIG. 6, the driver helm speaker component 110 is behind a vent V. The dash 140 may include a screen or other boat operation tools that provide statuses of the boat 100. In some embodiments, the frame 142 holds other components coupled to the dash 140 in place as well. In an example implementation, the driver helm speaker component 110 is positioned behind the frame 142 and the dash 140.

Referring to FIG. 7 and FIG. 8, the driver helm speaker component 110 includes a driver helm speaker enclosure 150*a*. The driver helm speaker enclosure 150*a* includes a first helm speaker opening 158, a second helm speaker opening 160, and a third helm speaker opening 162. The first helm speaker opening 158 is constructed to house the driver inboard speaker driver 152*a*. The second helm speaker opening 160 is constructed to house the driver outboard speaker driver 154*a*. The third helm speaker opening 162 is constructed to house the driver on-axis speaker driver 156*a*. The driver helm speaker enclosure 150*a* is also configured to house wiring and electrical connections for each of the driver inboard speaker driver 152*a*, the driver outboard speaker driver 154*a*, and the driver on-axis speaker driver 156*a*. The passenger helm speaker component 112 includes the same or similar components with the same designs.

A speaker opening may also referred to as a speaker cavity.

The driver inboard speaker driver 152*a* and the driver outboard speaker driver 154*a*, are mid-range speakers. The driver on-axis speaker driver 156*a* is a high-range speaker (sometimes referred to as a "tweeter"). Further, the passenger outboard speaker driver 152*b* and the passenger inboard speaker driver 154*b* are mid-range speakers while the passenger on-axis speaker driver 156*b* is a high-range speaker. In some embodiments, the driver inboard speaker driver 152*a*, the driver outboard speaker driver 154*a*, the driver on-axis speaker driver 156*a*, the passenger outboard speaker driver 152*b*, the passenger inboard speaker driver 154*b*, and the passenger on-axis speaker driver 156*b* are different types of speakers. In some embodiments, the driver helm speaker enclosure 150*a* is made of plastic and constructed with the indicated openings. Further, the driver helm speaker enclosure 150*a* includes openings that direct the driver inboard speaker driver 152*a* and the driver outboard speaker driver 154*a* at opposing angles relative to the direction of the driver on-axis speaker driver 156*a* when installed within the driver helm speaker enclosure 150*a*. This feature is discussed in more details with FIG. 9.

In some embodiments, the driver inboard speaker driver 152*a*, the driver outboard speaker driver 154*a*, the driver on-axis speaker driver 156*a*, the passenger outboard speaker driver 152*b*, the passenger inboard speaker driver 154*b*, and the passenger on-axis speaker driver 156*b* are positioned to minimize sound that reflects off the windshield W of the boat. In other words, in some embodiments, the driver inboard speaker driver 152*a*, the driver outboard speaker driver 154*a*, the driver on-axis speaker driver 156*a*, the passenger outboard speaker driver 152*b*, the passenger inboard speaker driver 154*b*, and the passenger on-axis speaker driver 156*b* are positioned to direct sound away from the windshield W of the boat. In some embodiments, the driver inboard speaker driver 152*a*, the driver outboard speaker driver 154*a*, the driver on-axis speaker driver 156*a*, the passenger outboard speaker driver 152*b*, the passenger inboard speaker driver 154*b*, and the passenger on-axis speaker driver 156*b* emit sound where ten percent or less of the emitted sound reflects off the windshield W. In some embodiments, the driver inboard speaker driver 152*a*, the driver outboard speaker driver 154*a*, the driver on-axis speaker driver 156*a*, the passenger outboard speaker driver 152*b*, the passenger inboard speaker driver 154*b*, and the passenger on-axis speaker driver 156*b* emit sound where twenty percent or less of the emitted sound reflects off the windshield W. In some embodiments, the driver inboard speaker driver 152*a*, the driver outboard speaker driver 154*a*, the driver on-axis speaker driver 156*a*, the passenger outboard speaker driver 152*b*, the passenger inboard speaker driver 154*b*, and the passenger on-axis speaker driver 156*b* emit sound where thirty percent or less of the emitted sound reflects off the windshield W. In some embodiments, the driver inboard speaker driver 152*a*, the driver outboard speaker driver 154*a*, the driver on-axis speaker driver 156*a*, the passenger outboard speaker driver 152*b*, the passenger inboard speaker driver 154*b*, and the passenger on-axis speaker driver 156*b* emit sound where forty percent or less of the emitted sound reflects off the windshield W. In some embodiments, the driver inboard speaker driver 152*a*, the driver outboard speaker driver 154*a*, the driver on-axis speaker driver 156*a*, the passenger outboard speaker driver 152*b*, the passenger inboard speaker driver 154*b*, and the passenger on-axis speaker driver 156*b* emit sound where fifty percent or less of the emitted sound reflects off the windshield W.

Figure 9:
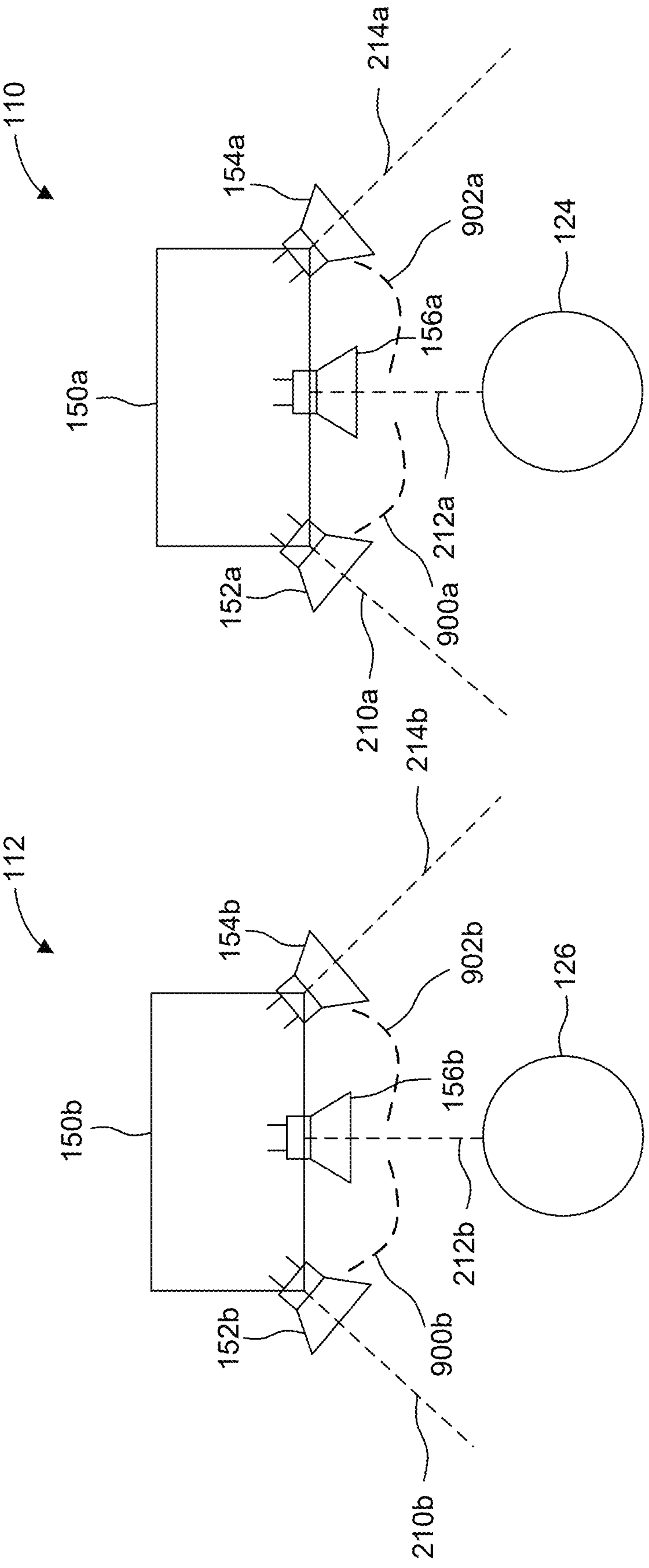
FIG. 9 illustrates a block diagram of helm speaker components according to an example embodiment.

FIG. 9 illustrates a block diagram of helm speaker components according to an example embodiment. Referring now to FIG. 9, an axis indicating a speaker driver's direction is shown for each driver of the driver helm speaker component 110 and the passenger helm speaker component 112. The passenger helm speaker enclosure 150*b* includes the passenger outboard speaker driver 152*b*, the passenger inboard speaker driver 154*b*, and the passenger on-axis speaker driver 156*b*. The driver inboard speaker driver 152*a* includes a first central axis 210*a*, the passenger outboard speaker driver 152*b* includes a second central axis 210*b*, the driver outboard speaker driver 154*a* includes a third central axis 214*a*, the passenger inboard speaker driver 154*b* includes a fourth central axis 214*b*, the driver on-axis speaker driver 156*a* includes a fifth central axis 212*a*, and the passenger on-axis speaker driver 156*b* includes a sixth central axis 212*b*.

In the embodiment illustrated in FIG. 9, the central axis of each speaker driver indicates the direction of the corresponding speaker driver. Accordingly, sound is primarily directed along the shown central axis. A more detailed description of sound distribution is provided in association with FIG. 17, FIG. 18, and FIG. 19. For example, the fifth central axis 212*a* indicates that the driver on-axis speaker driver 156*a* is directed towards the driver helm position 124. Thus, the driver helm position 124 is "on axis" for the driver on-axis speaker driver 156*a*. The passenger helm position 126 is also on-axis for the passenger on-axis speaker driver 156*b*. Also, the third central axis 214*a* is at a first angle 902*a* relative to the fifth central axis 212*a*. Further, the first central axis 210*a* is at a second angle 900*a* relative to the fifth central axis 212*a*. The second central axis 210*b* is at a third angle 900*b* relative to the sixth central axis 212*b*. Further, the fourth central axis 214*b* is at a fourth angle 902*b* relative to the sixth central axis 212*b*. In some embodiments, the first angle 902*a*, the second angle 900*a*, the third angle 900*b*, and the fourth angle 902*b* are forty-five degrees. In some embodiments, they are a different angle. In other embodiments, the second angle 900*a* and the third angle 900*b* are the same angle, while in other embodiments they are different angles. In some embodiments, the first angle 902*a* and the fourth angle 902*b* are the same angles, while in others they are different angles.

Figure 10:
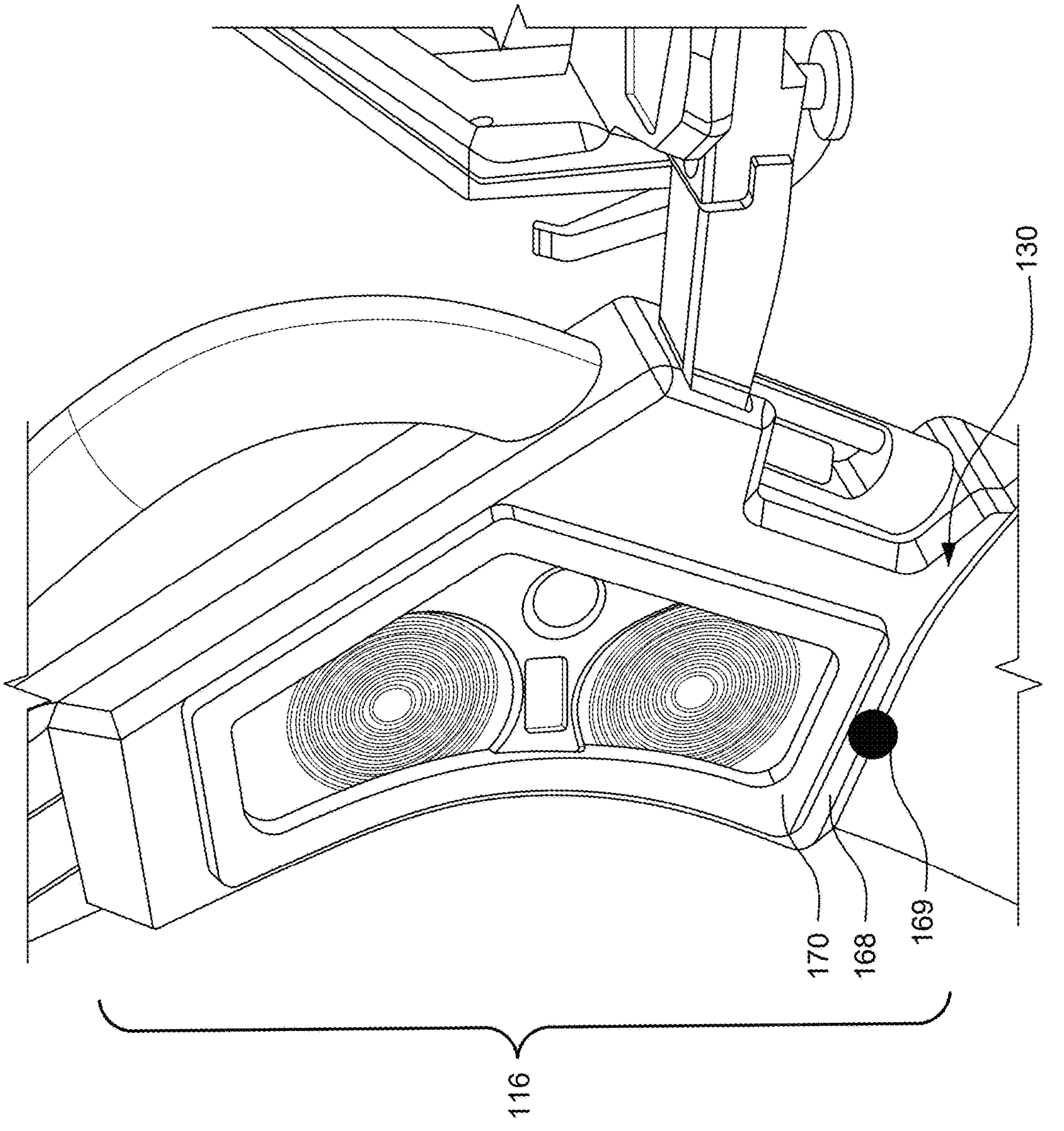
FIG. 10 illustrates a perspective view of a tower speaker component according to an example embodiment.
Figure 11:
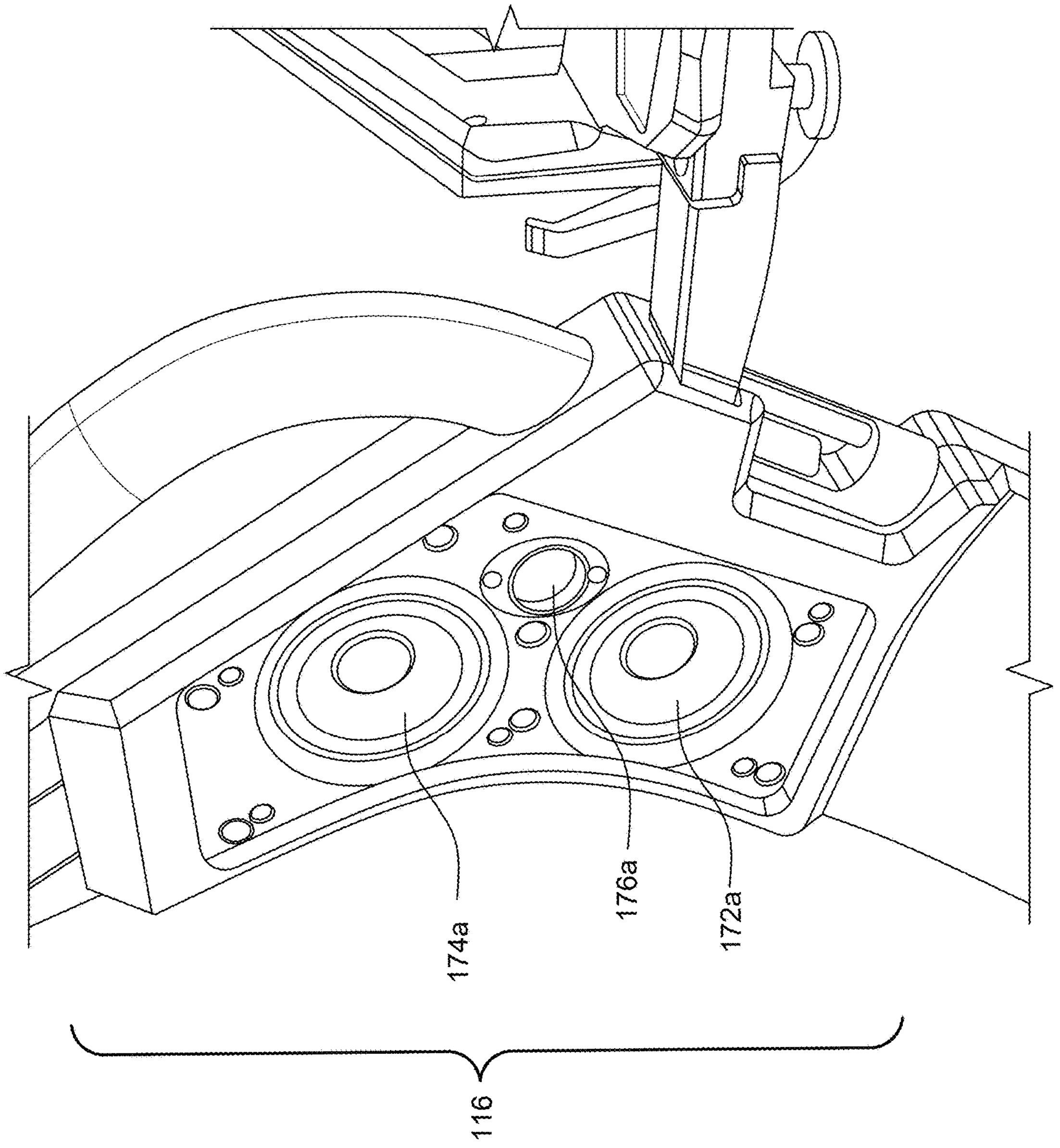
FIG. 11 illustrates a perspective view of the tower speaker component with a front panel removed according to an example embodiment.
Figure 12:
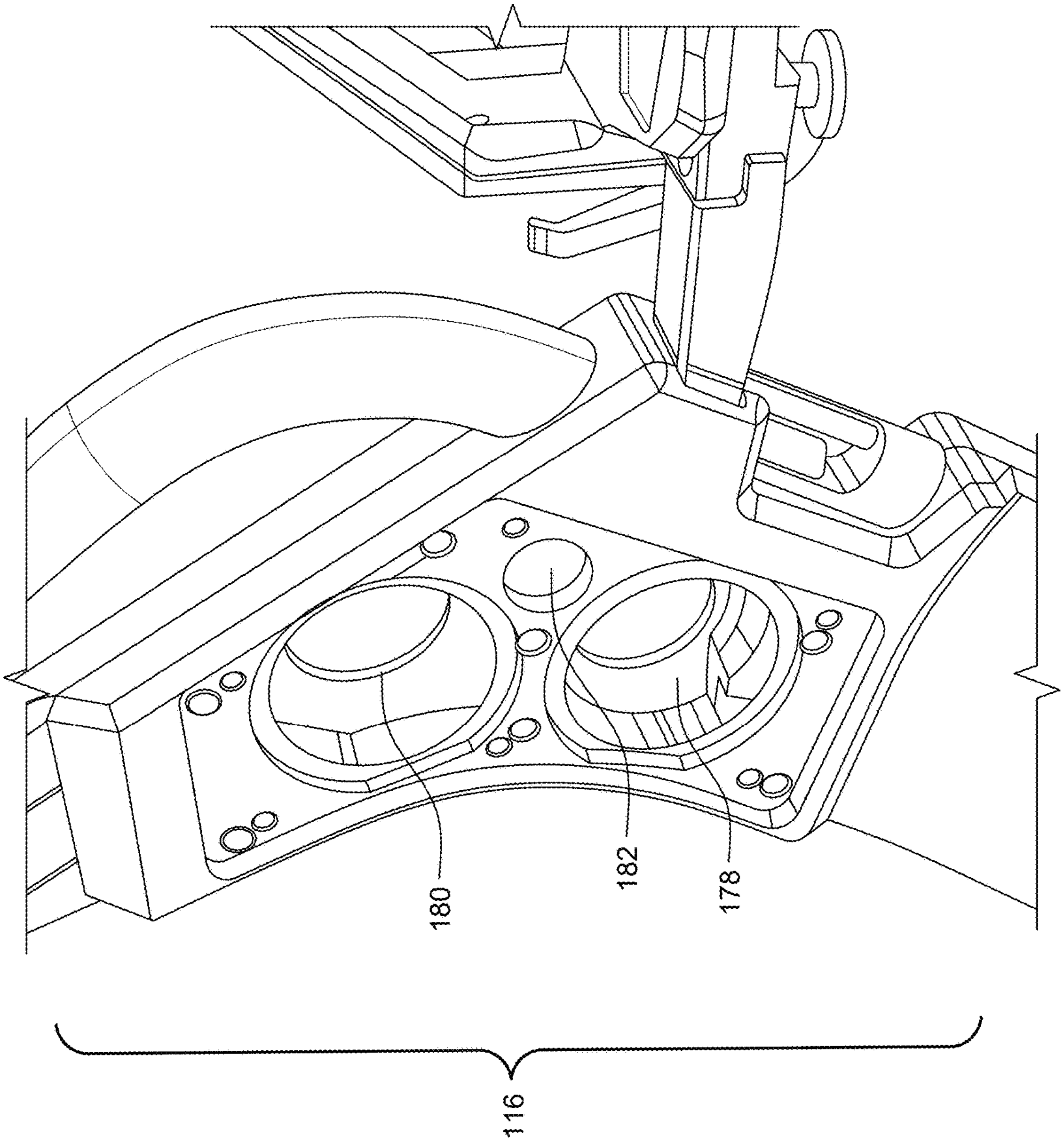
FIG. 12 illustrates a speaker enclosure for a tower speaker component according to an example embodiment.

FIG. 10, FIG. 11, and FIG. 12 collectively illustrate example components of the starboard tower speaker component 116. Particularly, FIG. 10 illustrates a perspective view of a tower speaker component according to an example embodiment, FIG. 11 illustrates a perspective view of the tower speaker component with a front panel removed according to an example embodiment, and FIG. 12 illustrates a speaker enclosure for a tower speaker component according to an example embodiment.

The starboard tower speaker component 116 includes the first starboard tower speaker driver 172*a*, the second starboard tower speaker driver 174*a*, and the third starboard tower speaker driver 176*a*. A starboard support leg 130 includes a vertical surface 168. Further, the starboard support leg 130 includes an outer casing 170 to protect the first starboard tower speaker driver 172*a*, the second starboard tower speaker driver 174*a*, and the third starboard tower speaker driver 176*a* of the starboard tower speaker component 116. Further, the starboard support leg 130 includes a tower speaker opening 178, a tower speaker opening 180, and a tower speaker opening 182 constructed to receive the first starboard tower speaker driver 172*a*, the second starboard tower speaker driver 174*a*, and the third starboard tower speaker driver 176*a*, respectively. The first starboard tower speaker driver 172*a*, the second starboard tower speaker driver 174*a*, and the third starboard tower speaker driver 176*a* are directed at an angle substantially perpendicular to the vertical surface 168 when mounted in a corresponding speaker opening.

The starboard support leg 130 is constructed to allow electrical connections to pass through inside its casing. These connections connect to the first starboard tower speaker driver 172*a*, the second starboard tower speaker driver 174*a*, and the third starboard tower speaker driver 176*a*. In some embodiments, additional speaker drivers are housed within the starboard tower speaker component 116. The port tower speaker component 114 includes the same or similar components and design.

Figure 13:
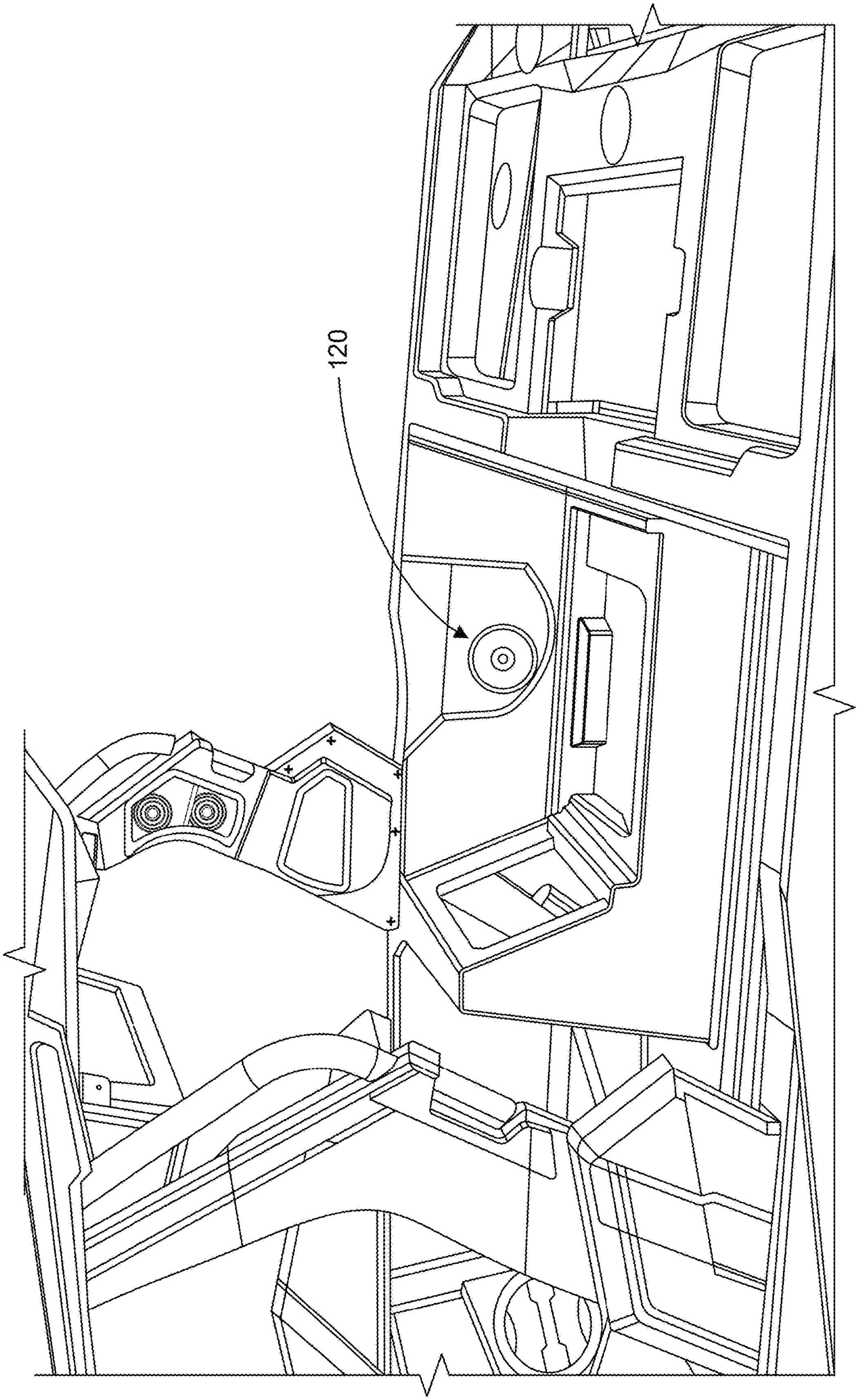
FIG. 13 illustrates a ported enclosure according to an example embodiment.
Figure 14:
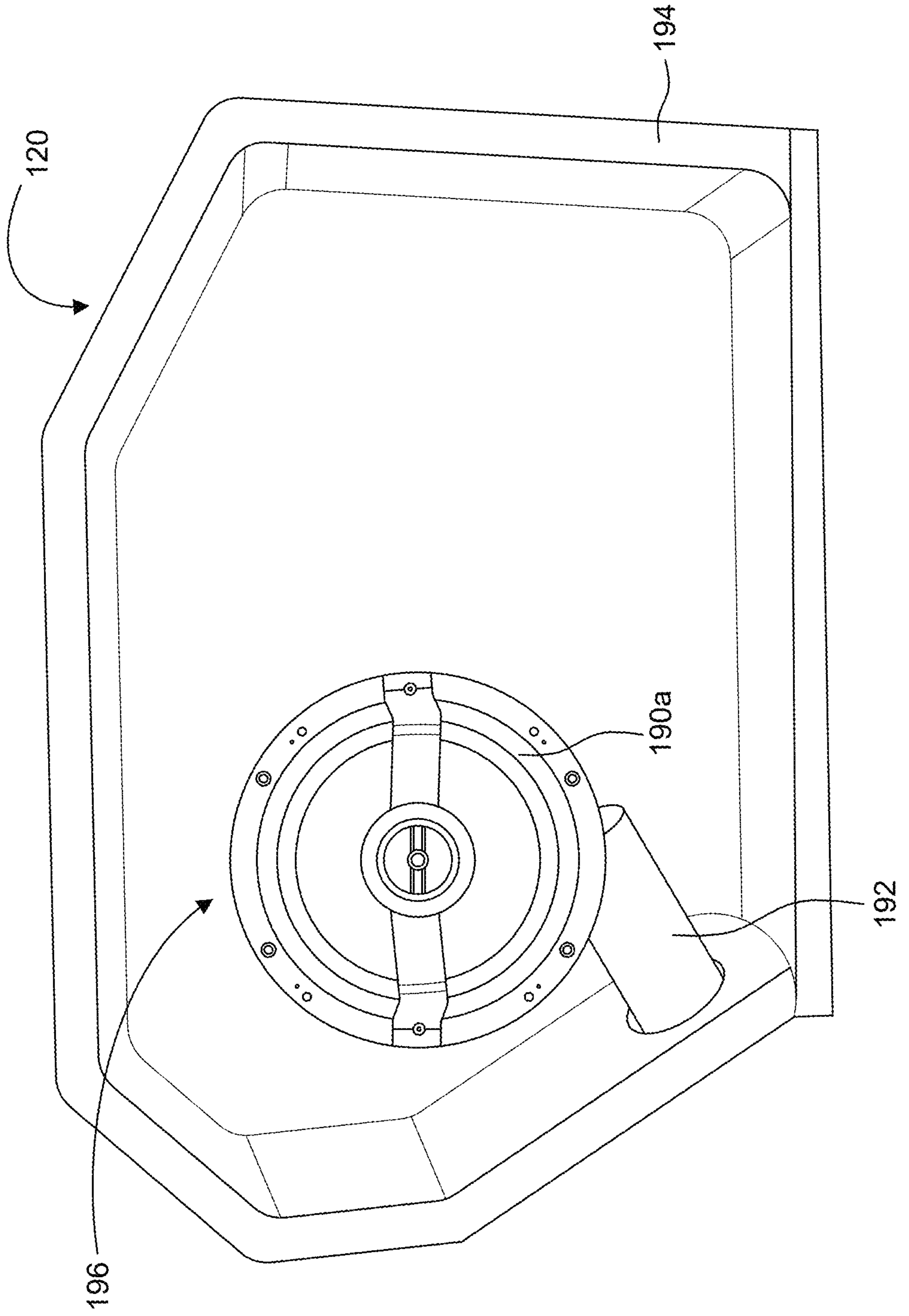
FIG. 14 illustrates a transparent view of the ported enclosure according to an example embodiment.

FIG. 13 illustrates a ported enclosure according to an example embodiment, and FIG. 14 illustrates a transparent view of the ported enclosure according to an example embodiment.

Referring to FIG. 13 and FIG. 14, components of the starboard ported enclosure speaker component 120 are shown. The starboard ported enclosure speaker component 120 includes a starboard ported enclosure speaker driver 190*a*, a speaker port 192, an enclosure 194, and a speaker opening 196.

The starboard ported enclosure speaker component 120 is a type of speaker enclosure that incorporates a port (also referred to as a vent). This port is a tube or opening that allows air to flow in and out of the enclosure. The port in a ported enclosure works together with the speaker to reinforce low-frequency sound waves. When the speaker cone moves inward, it compresses the air inside the enclosure. This compressed air then escapes through the port, creating additional sound waves that reinforce the output. The speaker opening 196 is designed to receive the starboard ported enclosure speaker driver 190*a*. In some embodiments, the speaker opening 196 is designed to receive a different speaker type, such as a subwoofer driver.

In an example implementation, the starboard ported enclosure speaker driver 190*a* is a full-range speaker and outputs all frequencies of an audio signal. The enclosure 194 amplifies the sound waves that are output by the starboard ported enclosure speaker driver 190*a*. The speaker port 192 is an opening from the enclosure 194 to within the cockpit of the boat 100. The speaker port 192 connects between the enclosure 194 and the cockpit of the boat 100, which allows for sound waves to transmit from within the enclosure 194 to the cockpit of the boat.

In some embodiments, the enclosure 194 is bonded together using an industrial glue or other adhesive. Then, the enclosure 194 is installed within the siding of the boat 100. The port ported enclosure speaker component 122 includes the same or similar components as those shown for the starboard ported enclosure speaker component 120.

Figure 15:
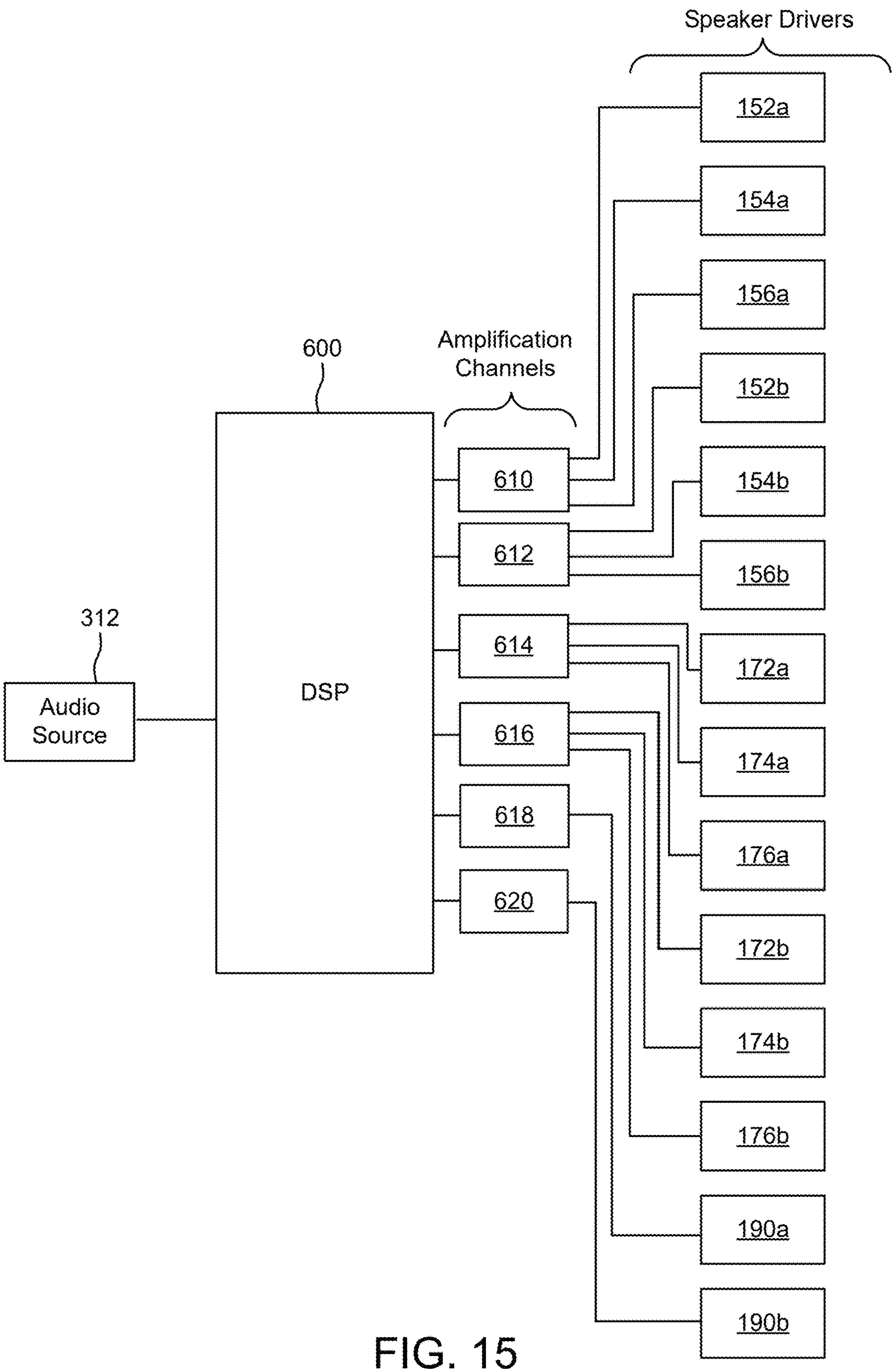
FIG. 15 illustrates a block diagram of a digital signal processor according to an example embodiment.

FIG. 15 illustrates an example block diagram of the DSP 600 according to an example embodiment. The DSP 600 connects to the audio source 312. The DSP 600 connects and delivers a processed audio signal to each connected amplification channel. The DSP 600 connects to a first amplification channel 610, a second amplification channel 612, a third amplification channel 614, a fourth amplification channel 616, a fifth amplification channel 618, and a sixth amplification channel 620.

The DSP outputs a processed signal to the first amplification channel 610, the second amplification channel 612, the third amplification channel 614, the fourth amplification channel 616, the fifth amplification channel 618, and the sixth amplification channel 620. Different speaker drivers share different channel groups. A channel is an independent component that can power a separate speaker and amplify the supplied signal to the speaker. Each channel has its own circuitry for amplifying the audio signal and its own output terminals for connecting to a designated speaker. Sharing a channel enables for the same audio signal, which includes its own frequency and direction of sound, to play from different speakers. This effect is helpful when directing directional sound, such as stereo music, to appropriate speakers. For instance, left-channel sound can be directed to a specific group of speakers located close together. The left-channel audio signal can be directed to a set of speakers that are positioned near each other, ensuring that the intended stereo effect (such as left and right separation) is achieved effectively.

The first amplification channel 610 controls power for the driver helm speaker component 110 and connects to the driver inboard speaker driver 152*a*, the driver outboard speaker driver 154*a*, and the driver on-axis speaker driver 156*a*. The second amplification channel 612 controls power for the passenger helm speaker component 112 and connects to the passenger outboard speaker driver 152*b*, the passenger inboard speaker driver 154*b*, and the passenger on-axis speaker driver 156*b*. The third amplification channel 614 controls power for the starboard tower speaker component 116 and connects to the first starboard tower speaker driver 172*a*, the second starboard tower speaker driver 174*a*, and the third starboard tower speaker driver 176*a*. The fourth amplification channel 616 controls power for the port tower speaker component 114 and connects to the first port tower speaker driver 172*b*, the second port tower speaker driver 174*b*, and the third port tower speaker driver 176*b*. The fifth amplification channel 618 controls power to the starboard ported enclosure speaker component 120 and connects to the starboard ported enclosure speaker driver 190*a*. The sixth amplification channel 620 controls power to the port ported enclosure speaker component 122 and connects to the port ported enclosure speaker driver 190*b*. In some embodiments, the driver inboard speaker driver 152*a*, the driver outboard speaker driver 154*a*, the driver on-axis speaker driver 156*a*, the passenger outboard speaker driver 152*b*, the passenger inboard speaker driver 154*b*, the passenger on-axis speaker driver 156*b*, the first starboard tower speaker driver 172*a*, the second starboard tower speaker driver 174*a*, the third starboard tower speaker driver 176*a*, the first port tower speaker driver 172*b*, the second port tower speaker driver 174*b*, the third port tower speaker driver 176*b*, the starboard ported enclosure speaker driver 190*a*, and the port ported enclosure speaker driver 190*b* are each configured to receive an independent digital signal processing channel as shown for the corresponding amplification channels. In some embodiments, the DSP 600 includes the first amplification channel 610, the second amplification channel 612, the third amplification channel 614, the fourth amplification channel 616, the fifth amplification channel 618, and the sixth amplification channel 620.

In some embodiments, the DSP 600 includes individual channels for each speaker driver or different channels for a group of speaker drivers. When a speaker has its own DSP channel, the speaker has its own dedicated circuitry and software for processing the audio signal it receives. This allows the speaker to independently manipulate and optimize the audio signal according to its specific characteristics and requirements. Having its own DSP channel enables the speaker to perform various functions such as equalization, filtering, time alignment, compression, and other audio processing techniques. This can help enhance the overall sound quality, improve frequency response, correct any anomalies, and tailor the audio output to match the characteristics of the speaker itself or the specific application requiring a speaker.

By having individual DSP channels, each speaker in a system can be individually calibrated and controlled, allowing for more precise tuning and customization of the audio output. It also provides flexibility in adjusting and optimizing the sound based on the speaker's location, placement, and acoustic environment, ensuring an optimal listening experience. In some embodiments, the driver inboard speaker driver 152*a*, the driver outboard speaker driver 154*a*, driver on-axis speaker driver 156*a*, passenger outboard speaker driver 152*b*, the passenger inboard speaker driver 154*b*, passenger on-axis speaker driver 156*b*, the first starboard tower speaker driver 172*a*, the second starboard tower speaker driver 174*a*, the third starboard tower speaker driver 176*a*, the first port tower speaker driver 172*b*, the second port tower speaker driver 174*b*, the third port tower speaker driver 176*b*, the starboard ported enclosure speaker driver 190*a*, and the port ported enclosure speaker driver 190*b* output as individually calibrated based on the output level for each speaker driver (or group of speaker drivers) required to overcome a predetermined level of wind noise in an audio zone corresponding to the speaker driver (or group of speaker drivers). Setting the level of audio output in this manner helps achieve audio clarity.

In some embodiments, the audio source 312 is a radio, phone, mp3 player, or other audio source. In some embodiments, the audio source 312 is generated by a different device. In some embodiments, the audio source 312 is a digital signal to be processed by the DSP 600. The audio source 312 may be configured to generate stereo sound or mono sound. In some embodiments, the DSP 600 connects to additional amplification channels not shown.

Figure 16:
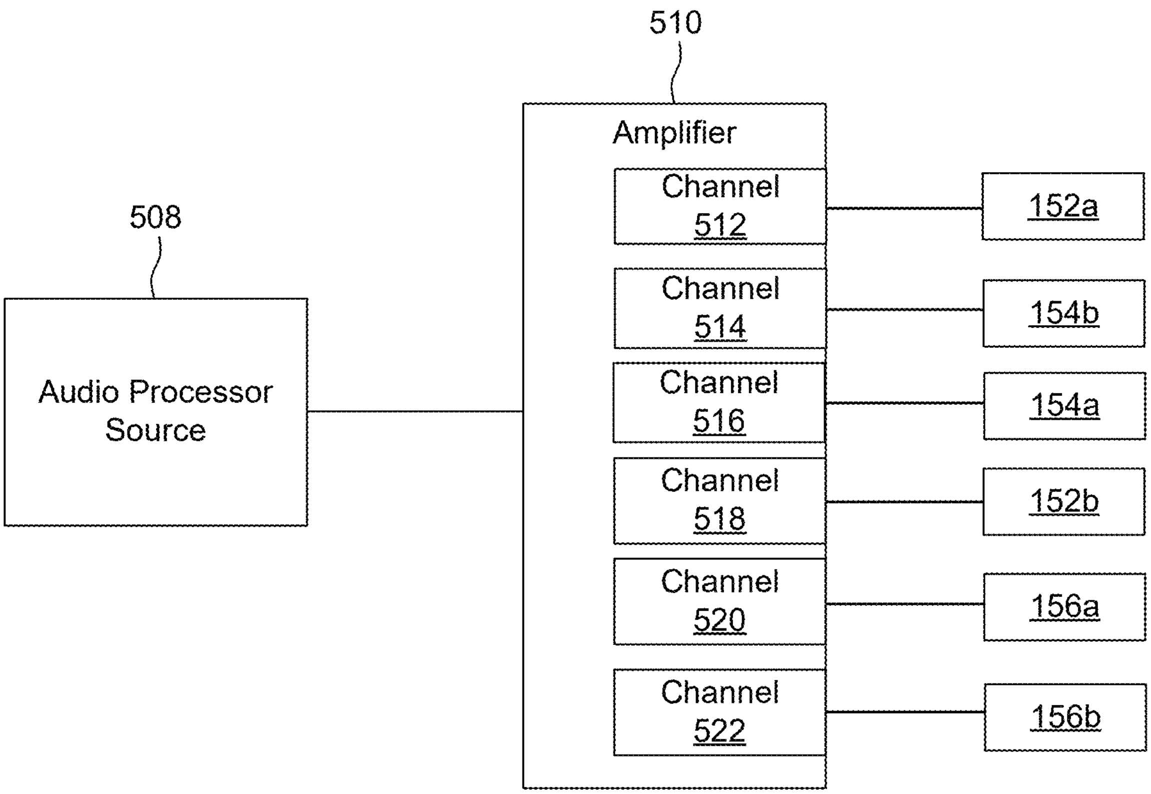
FIG. 16 illustrates a block diagram of an amplifier for powering the speaker drivers according to an example embodiment.
Figure 17:
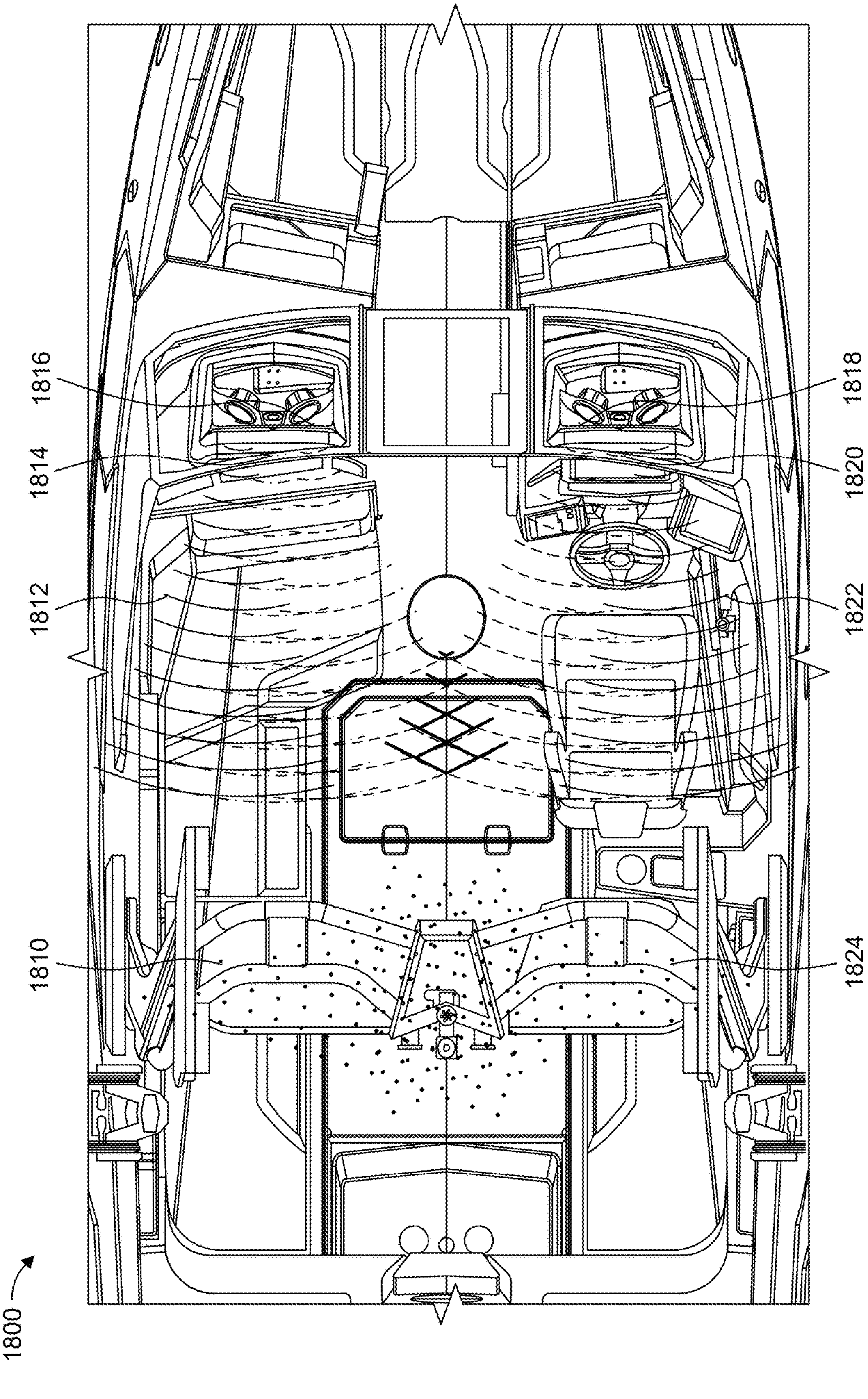
FIG. 17 illustrates a first view of sound distribution of the speaker system shown in FIG. 5.

FIG. 16 illustrates a block diagram of an amplifier for powering the speaker drivers according to an example embodiment. As shown in FIG. 17 an amplifier 510 powers the speaker drivers described above in connection with FIG. 9 and integrates the amplification channels within the amplifier 510. The amplifier 510 includes a first channel 512, a second channel 514, a third channel 516, fourth channel 518, a fifth channel 520, and a sixth channel 522. Further, the amplifier 510 receives an audio signal from an audio processor source 508. The audio processor source may be the DSP 600. The first channel 512 connects to driver inboard speaker driver 152*a*, the second channel 514 connects to the passenger inboard speaker driver 154*b*, the third channel 516 connects to the driver outboard speaker driver 154*a*, the fourth channel 518 connects to the passenger outboard speaker driver 152*b*, the fifth channel 520 connects to the driver on-axis speaker driver 156*a*, and the sixth channel 522 connects to the passenger on-axis speaker driver 156*b*. In some embodiments, the amplifier 508 is used alternatively to the first amplification channel 610, the second amplification channel 612, the third amplification channel 614, the fourth amplification channel 616, the fifth amplification channel 618, and the sixth amplification channel 620.

The first channel 512, the second channel 514, the third channel 516, the fourth channel 518, the fifth channel 520, and the sixth channel 522 actively powers the corresponding connected speaker driver(s). The amplifier 510 receives the audio signal from the audio processor source 508, which is to be amplified and provided to the corresponding speaker drivers. The amplifier 510 includes circuitry, such as analog transistor circuits, that increases the voltage level of the audio signal from the audio processor source 508 to a level that is capable of operating the corresponding speaker driver and cause it to produce an appropriate volume level. For example, a diaphragm of the driver inboard speaker driver 152*a* is driven by the amplified voltage signal produced by the amplifier 510. In some embodiments, the amplifier 510 provides features of removing resonances and optimizes sound for a particular enclosure to deliver full range sound. In some embodiments, the amplifier 510 amplifies the audio signal from the audio processor source 508 so that the driver inboard speaker driver 152*a*, the driver outboard speaker driver 154*a*, driver on-axis speaker driver 156*a*, passenger outboard speaker driver 152*b*, the passenger inboard speaker driver 154*b*, and passenger on-axis speaker driver 156*b* output as individually calibrated based on the output level for each speaker driver (or group of speaker drivers) required to overcome a predetermined level of wind noise in an audio zone corresponding to the speaker driver (or group of speaker drivers).

The first channel 512, the second channel 514, the third channel 516, the fourth channel 518, the fifth channel 520, and the sixth channel 522 each produce a corresponding amplified signal. In some embodiments, the first channel 512 and the second channel 514 form an inboard group. In some embodiments, the third channel 516 and the fourth channel 518 form an outboard group. In some embodiments, the fifth channel 520 and the sixth channel 522 form a tweeter group.

The audio signal from the audio processor source 508 corresponds to audio that is to be played over the driver inboard speaker driver 152*a*, the driver outboard speaker driver 154*a*, driver on-axis speaker driver 156*a*, passenger outboard speaker driver 152*b*, the passenger inboard speaker driver 154*b*, and passenger on-axis speaker driver 156*b*. In some embodiments, the audio processor source 508 produces a digitally processed signal and provides the digitally processed signal to the amplifier 510. In some embodiments, the amplifier 510 includes additional channels for the first starboard tower speaker driver 172*a*, the second starboard tower speaker driver 174*a*, the third starboard tower speaker driver 176*a*, the first port tower speaker driver 172*b*, the second port tower speaker driver 174*b*, the third port tower speaker driver 176*b*, the starboard ported enclosure speaker driver 190*a*, and the port ported enclosure speaker driver 190*b*, each of which is configured to output in the range of 100-120 dB. In some embodiments, the amplifier 510 includes additional channels.

In some embodiments, the driver inboard speaker driver 152*a*, the driver outboard speaker driver 154*a*, driver on-axis speaker driver 156*a*, passenger outboard speaker driver 152*b*, the passenger inboard speaker driver 154*b*, passenger on-axis speaker driver 156*b*, the first starboard tower speaker driver 172*a*, the second starboard tower speaker driver 174*a*, the third starboard tower speaker driver 176*a*, the first port tower speaker driver 172*b*, the second port tower speaker driver 174*b*, the third port tower speaker driver 176*b*, the starboard ported enclosure speaker driver 190*a*, and the port ported enclosure speaker driver 190*b* are self actively powered and include an individual amplifier circuit for producing sound. In further embodiments, some speaker drivers connect to the amplifier 510 while others are independently powered by themselves. In some embodiments, the DSP 600 and amplifier 510 are within the same device or system.

Figure 18:
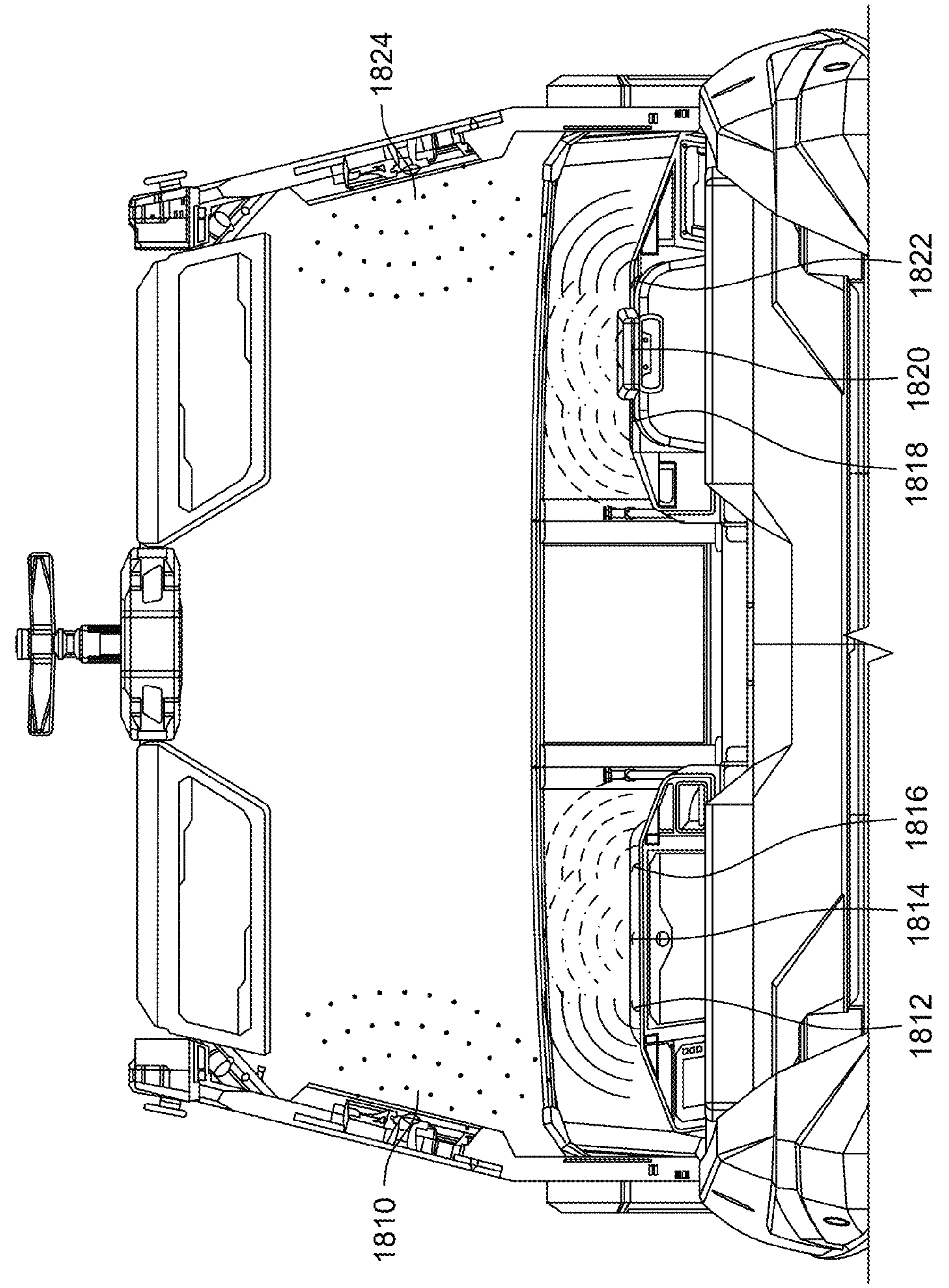
FIG. 18 illustrates a second view of the sound distribution of FIG. 17.
Figure 19:
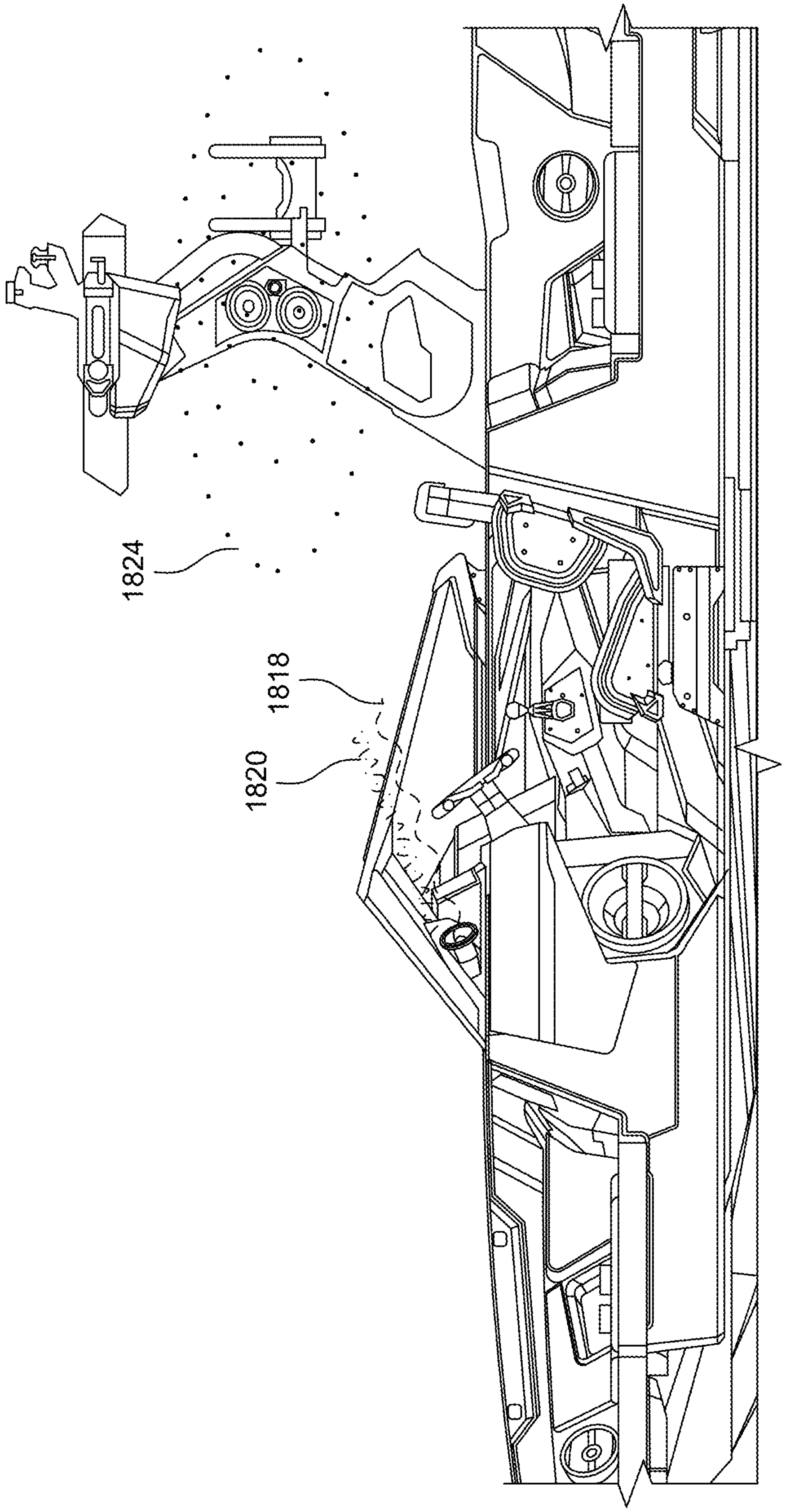
FIG. 19 illustrates a third view of the sound distribution of FIG. 17.

FIG. 17, FIG. 18, and FIG. 19 illustrate sound distribution by speaker drivers of the speaker system 102. Particularly, FIG. 17 illustrates a first view of sound distribution of the speaker system shown in FIG. 5, FIG. 18 illustrates a second view of the sound distribution of FIG. 18, and FIG. 19 illustrates a third view of the sound distribution of FIG. 17.

The sound distribution diagram 1800 illustrates a first sound signal distribution 1810, a second sound signal distribution 1812, a third sound signal distribution 1814, a fourth sound signal distribution 1816, a fifth sound signal distribution 1818, a sixth sound signal distribution 1820, a seventh sound signal distribution 1822, and an eighth sound signal distribution 1824.

The first sound signal distribution 1810, the second sound signal distribution 1812, the third sound signal distribution 1814, the fourth sound signal distribution 1816, the fifth sound signal distribution 1818, the sixth sound signal distribution 1820, the seventh sound signal distribution 1822, and the eighth sound signal distribution 1824 provide a simplified image of how the sound emits from the corresponding speaker driver. The port tower speaker component 114 produces the first sound signal distribution 1810. The passenger outboard speaker driver 152*b* produces the second sound signal distribution 1812. The passenger on-axis speaker driver 156*b* produces the third sound signal distribution 1814. The passenger inboard speaker driver 154*b* produces the fourth sound signal distribution 1816. The driver inboard speaker driver 152*a* produces the fifth sound signal distribution 1818. The driver on-axis speaker driver 156*a* produces the sixth sound signal distribution 1820. The driver outboard speaker driver 154*a* produces the seventh sound signal distribution 1822. The starboard tower speaker component 116 produces the eighth sound signal distribution 1824.

In addition, the first sound signal distribution 1810 and eighth sound signal distribution 1824 are tower signals. The second sound signal distribution 1812 and seventh sound signal distribution 1822 are outboard sound signal distributions. The third sound signal distribution 1816 and fourth sound signal distribution 1818 are inboard signals. The third sound signal distribution 1814 and the sixth sound signal distribution 1820 are high-range signals.

The second sound signal distribution 1812 and seventh sound signal distribution 1822 produce the sound aimed outboard. In some embodiments, the second sound signal distribution 1812 and seventh sound signal distribution 1822 are directed towards the edge of the windshield W where sound produced from the boat moving originates. This direction helps counteract the wind noise. The second sound signal distribution 1812 and seventh sound signal distribution 1822 may also produce sound outside the cockpit of the boat.

The third sound signal distribution 1814 is aimed at the passenger helm position 126 and the sixth sound signal distribution 1820 is aimed at the driver helm position 124. In some embodiments, the third sound signal distributions 1814 and the sixth sound signal distribution 1820 carry throughout the boat 100.

The third sound signal distribution 1816 and fourth sound signal distribution 1818 are aimed inboard. Further, the third sound signal distribution 1816 and fourth sound signal distribution 1818 fill the cockpit with audio sound. Further, as seen, the third sound signal distribution 1816 and fourth sound signal distribution 1818 may be tuned to add further gain to the audio. That is, the sound waves are tuned to be synchronized, so the waves amplify one another.

The first sound signal distribution 1810 and eighth sound signal distribution 1824 are tower signals. The first sound signal distribution 1810 and eighth sound signal distribution 1824 transmit under the tower 118 to fill the cockpit of the boat 100. In addition, the sound signal distributions 1810 and 1824 may be tuned to amplify one another through being synchronized.

Additional Example Implementations

In an example implementation, a speaker system 102 for a boat 100 includes a first speaker enclosure 150*a*. The first speaker enclosure 150*a* has a first speaker opening 162, a second speaker opening 158, and a third speaker opening 160. The first speaker opening 162 is constructed to receive a first driver 156*a* having a first central axis 212*a*. The second speaker opening 158 is constructed to receive a second driver 152*a* having a second central axis 210*a*. The third speaker opening 160 is constructed to receive a third driver 154*a* having a third central axis 214*a*. When the first driver 152*a*, the second driver 154*a*, and the third driver 156*a* are installed to the first speaker opening 162, the second speaker opening 158, and the third speaker opening 160, the second central axis 210*a* is at a first angle 900*a* relative to the first central axis 212*a*, and the third central axis 214*a* is at a second angle 902*a* relative to the first central axis 212*a*. The first central axis 212*a* extends towards a first helm 124, the second central axis 210*a* extends towards a second helm, and the third central axis 214*a* extends outboard of the boat.

In some embodiments, the first angle 900*a* is substantially forty-five degrees, and the second angle 902*a* is substantially forty-five degrees.

In some embodiments, the speaker system 102 further includes the first driver 156*a*, the second driver 152*a*, and the third driver 154*a*.

In some embodiments, the first driver 156*a* is a high-range speaker, the second driver 152*a* is a mid-range speaker, and the third driver 154*a* is a mid-range speaker.

In some embodiments, the first driver 156*a*, the second driver 152*a*, and the third driver 154*a* are each configured to receive an independent digital signal processing channel 610, 612, 614, 616, 618, or 620.

In some embodiments, the speaker system 102 further includes a first ported enclosure 120 having a first full-range speaker opening 196 constructed to receive a first full-range speaker 190*a* and a speaker port 192 located on the front, back, or a side of the first ported enclosure. The first ported enclosure 120 is bonded into a starboard wall of the boat 100.

In some embodiments, the speaker system 102 further includes a second speaker enclosure 150*b*, the second speaker enclosure 150*b* having a fourth speaker opening, a fifth speaker opening, and a sixth speaker opening. The fourth speaker opening is constructed to receive a fourth driver 156*b* having a fourth central axis 212*b*, the fifth speaker opening is constructed to receive a fifth driver 154*b* having a fifth central axis 214*b*, and the sixth speaker opening is constructed to receive a sixth driver 152*b* having a sixth central axis 210*b*. When the fourth driver 156*b*, the fifth driver 154*b*, and the sixth driver 152*b* are installed to the fourth speaker opening, the fifth speaker opening, and the sixth speaker opening, the fifth central axis 214*b* is at a third angle 902*b* relative to the fourth central axis 212*b*, and the sixth central axis 210*b* is at a fourth angle 900*b* relative to the fourth central axis 212*b*. The fourth central axis 212*b* extends towards the second helm 126, the fifth central axis 214*b* extends towards the first helm 124, and the sixth central axis 210*b* extends outboard of the boat 100.

In some embodiments, the first speaker enclosure 150*a* is built into a dash 140 of the boat or a glovebox of the boat.

In some embodiments, the speaker system 102 further includes a boat tower 118, including: a first mounting foot 128 configured to attach to the boat 100; a first vertical support 130 coupled to the first mounting foot 128. The first vertical support includes a vertical surface 168; one or more speaker openings 178, 180, or 182 within the vertical surface 168 of the first vertical support 130. The one or more speaker openings 178, 180, or 182 are constructed to receive one or more drivers 172*a*, 174*a*, or 176*a*. The first vertical surface 168 faces inboard.

In some embodiments, the speaker system 102 further includes the one or more drivers 172*a*, 174*a*, or 176*a*. The one or more drivers 172*a*, 174*a*, or 176*a* each include a central axis extending at an angle substantially perpendicular to the vertical surface 168 when received by the one or more speaker openings 178, 180, or 182.

In another example implementation, a speaker system 102 for a boat 100 includes a boat tower 118. The boat tower 118 includes a first mounting foot 128 configured to attach to the boat 100 and a first vertical support 130 coupled to the first mounting foot 128. The first vertical support 130 includes a vertical surface 168. The boat tower 118 further includes a first speaker opening 182, a second speaker opening 180, and a third speaker opening 178 within the vertical surface 168 of the first vertical support 130. The first speaker opening 182, the second speaker opening 180, and the third speaker opening 178 are constructed to receive a first driver 176*a*, a second driver 174*a*, and a third driver 172*a*. The first vertical surface 168 faces inboard.

In some embodiments, the speaker system 102 further includes the first driver 176*a*, the second driver 174*a*, and the third driver 172*a*. The first driver 176*a*, the second driver 174*a*, and the third driver 172*a* are directed at an angle substantially perpendicular to the vertical surface 168 when received by the first speaker opening 182, the second speaker opening 180, and the third speaker opening 178.

In some embodiments, the first driver 176*a*, the second driver 174*a*, and the third driver 172*a* are actively powered by a digital signal processor 600.

In some embodiments, the first driver 176*a* is a high-range speaker, and the second driver 174*a* and the third driver 172*a* are mid-range speakers.

In some embodiments, the first driver 176*a*, the second driver 174*a*, and the third driver 172*a* are directed within the boat when received by the first speaker opening 182, the second speaker opening 180, and the third speaker opening 178.

In some embodiments, the speaker system 102 further includes: a first ported enclosure 120 having: a first full-range speaker opening 196 constructed to receive a first full-range speaker 190*a*, a speaker port 192 located on the front, back, or a side of the first ported enclosure 120, and wherein the first ported enclosure 120 being bonded into a starboard wall of the boat 100.

In some embodiments, the boat tower 118 further includes a second mounting foot 132 configured to attach to the boat 100 and a second vertical support 134 coupled to the second mounting foot 132. The second vertical support 134 includes a second vertical surface; a fourth speaker opening, a fifth speaker opening, and a sixth speaker opening within the second vertical surface of the second vertical support. The fourth speaker opening, the fifth speaker opening, and the sixth speaker opening are constructed to receive a fourth driver 176*b*, a fifth driver 174*b*, and a sixth driver 172*b*. The second vertical surface faces inboard.

In some embodiments, the speaker system 102 further includes a first speaker enclosure 150*a*. The first speaker enclosure 150*a* has a fourth speaker opening 162, a fifth speaker opening 158, and a sixth speaker opening 160. The fourth speaker opening 162 is constructed to receive a fourth driver 156*a* having a first central axis 212*a*, the fifth speaker opening 158 is constructed to receive a fifth driver 152*a* having a second central axis 210*a*, and the sixth speaker opening 160 is constructed to receive a sixth driver 154*a* having a third central axis 214*a*. When the fourth driver 156*a*, the fifth driver 152*a*, and the sixth driver 154*a* are installed to the fourth speaker opening 162, the fifth speaker opening 158, and the sixth speaker opening 160, the second central axis 210*a* is at a first angle 900*a* relative to the first central axis 212*a*, and the third central axis 214*a* is at a second angle 902*a* relative to the first central axis 212*a*. The first central axis 212*a* extends towards a first helm 124, the second central axis 210*a* extends towards a second helm 126, and the third central axis 214*a* extends outboard of the boat 100.

In yet another example implementation, a speaker system 102 for a boat 100 includes a first speaker enclosure 150*a*. The first speaker enclosure 150*a* has a first speaker opening 162, a second speaker opening 158, and a third speaker opening 160. The first speaker opening 162 is constructed to receive a first driver 156*a* having a first central axis 212*a*. The second speaker opening 158 is constructed to receive a second driver 152*a* having a second central axis 210*a*. The third speaker opening 160 is constructed to receive a third driver 154*a* having a third central axis 214*a*. When the first driver 152*a*, the second driver 154*a*, and the third driver 156*a* are installed to the first speaker opening 162, the second speaker opening 158, and the third speaker opening 160, the second central axis 210*a* is at a first angle 900*a* relative to the first central axis 212*a*, and the third central axis 214*a* is at a second angle 902*a* relative to the first central axis 212*a*. The first central axis 212*a* extends towards a first helm 124, the second central axis 210*a* extends towards a second helm 126, and the third central axis 214*a* extends outboard of the boat. The speaker system 102 further includes a second speaker enclosure 150*b*. The second speaker enclosure 150*b* has a fourth speaker opening, a fifth speaker opening and a sixth speaker opening. The fourth speaker opening is constructed to receive a fourth driver 152*b* having a fourth central axis 212*b*, the fifth speaker opening is constructed to receive a fifth driver 154*b* having a fifth central axis 214*b*, and the sixth speaker opening is constructed to receive a sixth driver 152*b* having a sixth central axis 210*b*. When the fourth driver 156*b*, the fifth driver 154*b*, and the sixth driver 152*b* are installed to the fourth speaker opening, the fifth speaker opening, and the sixth speaker opening, the fifth central axis 214*b* is at a third angle 902*b* relative to the fourth central axis 212*b*, and the sixth central axis 210*b* is at a fourth angle 900*b* relative to the fourth central axis 212*b*. The fourth central axis 212*b* extends towards the second helm 126, the fifth central axis 214*b* extends towards the first helm 124, and the sixth central axis 210*b* extends outboard of the boat 100. The speaker system 102 further includes a boat tower 118. The boat tower includes a first mounting foot 128 and a second mounting foot 132. The first mount foot 128 and the second mounting foot 132 are configured to attach to the boat 100. The boat tower 118 further includes a first vertical support 130 coupled to the first mounting foot 128. The first vertical support 130 includes a vertical surface 168, a seventh speaker opening 182, an eighth speaker opening 180, and a ninth speaker opening 178 within the vertical surface 168 of the first vertical support 130. The seventh speaker opening 182, the eighth speaker opening 180, and the ninth speaker opening 178 are constructed to receive a seventh driver 176*a*, an eighth driver 174*a*, and a ninth driver 172*a*. The boat tower 118 further includes a second vertical support 134 including a second vertical surface. The second vertical support 134 is coupled to the second mounting foot 132. The boat tower 118 further includes a tenth speaker opening, an eleventh speaker opening, and a twelfth speaker opening within the second vertical surface of the second vertical support 134. The tenth speaker opening, the eleventh speaker opening, and the twelfth speaker opening are constructed to receive a tenth driver 176*b*, an eleventh driver 174*b*, and a twelfth driver 172*b*. The speaker system 102 further includes a first ported enclosure 120 having a first full-range speaker opening 196 constructed to receive a first full-range speaker 190*a* and a speaker port 192 located on the front, back, or a side of the first ported enclosure. The first ported enclosure 120 is bonded into a starboard wall of the boat.

In some embodiments, the speaker system 102 further includes a digital signal processor 600 configured to actively power one or more drivers 152*a*, 154*a*, 156*a*, 152*b*, 154*b*, 156*b*, 172*a*, 174*a*, 178, 172*b*, 174*b*, 176*b*, 190*a*, or 190*b* when the one or more drivers 152*a*, 154*a*, 156*a*, 152*b*, 154*b*, 156*b*, 172*a*, 174*a*, 178, 172*b*, 174*b*, 176*b*, 190*a*, or 190*b* are received by the first speaker opening 162, the second speaker opening 158, the third speaker opening 160, the forth speaker opening, the fifth speaker opening, the sixth speaker opening, the seventh speaker opening 182, the eighth speaker opening 180, the ninth speaker opening 178, the tenth speaker opening, the eleventh speaker opening, the twelfth speaker opening, or the first full-range speaker opening 196.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A speaker system for a boat, comprising:
a first speaker enclosure, the first speaker enclosure having a first speaker opening, a second speaker opening and a third speaker opening,
wherein the first speaker opening is constructed to receive a first driver having a first central axis, the second speaker opening is constructed to receive a second driver having a second central axis, and the third speaker opening is constructed to receive a third driver having a third central axis,
wherein when the first driver, the second driver, and the third driver are installed to the first speaker opening, the second speaker opening, and the third speaker opening, the second central axis is at a first angle relative to the first central axis, and the third central axis is at a second angle relative to the first central axis; and
wherein the first central axis extends towards a first helm, the second central axis extends towards a second helm, and the third central axis extends outboard of the boat.

2. The speaker system of claim 1, wherein the first angle is substantially forty-five degrees, and the second angle is substantially forty-five degrees.

3. The speaker system of claim 1, further comprising the first driver, the second driver, and the third driver.

4. The speaker system of claim 3, wherein the first driver is a high-range speaker, the second driver is a mid-range speaker, and the third driver is a mid-range speaker.

5. The speaker system of claim 4, wherein the first driver, the second driver, and the third driver are each configured to receive an independent digital signal processing channel.

6. The speaker system of claim 1, further comprising:
a first ported enclosure having:
a first full-range speaker opening constructed to receive a first full-range speaker,
a speaker port located on the front, back, or a side of the first ported enclosure, and
wherein the first ported enclosure being bonded into a starboard wall of the boat.

7. The speaker system of claim 1, further comprising:
a second speaker enclosure, the second speaker enclosure having a fourth speaker opening, a fifth speaker opening, and a sixth speaker opening,
wherein the fourth speaker opening is constructed to receive a fourth driver having a fourth central axis, the fifth speaker opening is constructed to receive a fifth driver having a fifth central axis, and the sixth speaker opening is constructed to receive a sixth driver having a sixth central axis,
wherein when the fourth driver, the fifth driver, and the sixth driver are installed to the fourth speaker opening, the fifth speaker opening, and the sixth speaker opening, the fifth central axis is at a third angle relative to the fourth central axis, and the sixth central axis is at a fourth angle relative to the fourth central axis; and
wherein the fourth central axis extends towards the second helm, the fifth central axis extends towards the first helm, and the sixth central axis extends outboard of the boat.

8. The speaker system of claim 1, wherein the first speaker enclosure is built into a dash of the boat or a glovebox of the boat.

9. The speaker system of claim 1, further comprising:
a boat tower, comprising:
a first mounting foot configured to attach to the boat;
a first vertical support coupled to the first mounting foot, the first vertical support including a vertical surface;
one or more speaker openings within the vertical surface of the first vertical support, the one or more speaker openings constructed to receive one or more drivers; and
wherein the first vertical surface faces inboard.

10. The speaker system of claim 9, further comprising:
the one or more drivers and
wherein the one or more drivers each include a central axis extending at an angle substantially perpendicular to the vertical surface when received by the first speaker opening, the second speaker opening, and the third speaker opening.

11. A speaker system for a boat, comprising:
a first speaker enclosure, the first speaker enclosure having a first speaker opening, a second speaker opening, and a third speaker opening,
wherein the first speaker opening is constructed to receive a first driver having a first central axis, the second speaker opening is constructed to receive a second driver having a second central axis, and the third speaker opening is constructed to receive a third driver having a third central axis,
wherein when the first driver, the second driver, and the third driver are installed to the first speaker opening, the second speaker opening, and the third speaker opening, the second central axis is at a first angle relative to the first central axis, and the third central axis is at a second angle relative to the first central axis;
wherein the first central axis extends towards a first helm, the second central axis extends towards a second helm, and the third central axis extends outboard of the boat;
a second speaker enclosure, the second speaker enclosure having a fourth speaker opening, a fifth speaker opening and a sixth speaker opening,
wherein the fourth speaker opening is constructed to receive a fourth driver having a fourth central axis, the fifth speaker opening is constructed to receive a fifth driver having a fifth central axis, and the sixth speaker opening is constructed to receive a sixth driver having a sixth central axis,
wherein when the fourth driver, the fifth driver, and the sixth driver are installed to the fourth speaker opening, the fifth speaker opening, and the sixth speaker opening, the fifth central axis is at a third angle relative to the fourth central axis, and the sixth central axis is at a fourth angle relative to the fourth central axis; and
wherein the fourth central axis extends towards the second helm, the fifth central axis extends towards the first helm, and the sixth central axis extends outboard of the boat;
a boat tower, comprising:
a first mounting foot and second mounting foot configured to attach to the boat;

a first vertical support coupled to the first mounting foot, the first vertical support including a vertical surface;

a seventh speaker opening, an eighth speaker opening, and a ninth speaker opening within the vertical surface of the first vertical support, the seventh speaker opening, the eighth speaker opening, and the ninth speaker opening constructed to receive a seventh driver, an eighth driver, and a ninth driver;

a second vertical support including a second vertical surface, the second vertical support coupled to the second mounting foot; and a tenth speaker opening, an eleventh speaker opening, and a twelfth speaker opening within the second vertical surface of the second vertical support, the tenth speaker opening, the eleventh speaker opening, and the twelfth speaker opening constructed to receive a tenth driver, an eleventh driver, and a twelfth driver; and a first ported enclosure having:

a first full-range speaker opening constructed to receive a first full-range speaker, a speaker port located on the front, back, or a side of the first ported enclosure, and wherein the first ported enclosure being bonded into a starboard wall of the boat.

12. The speaker system of claim 11, further comprising a digital signal processor configured to actively power one or more drivers when the one or more drivers are received by the first speaker opening, the second speaker opening, the third speaker opening, the forth speaker opening, the fifth speaker opening, the sixth speaker opening, the seventh speaker opening, the eighth speaker opening, the ninth speaker opening, the tenth speaker opening, the eleventh speaker opening, the twelfth speaker opening, or the first full-range speaker opening.

* * * * *